(12) United States Patent
Zhang et al.

(10) Patent No.: US 12,511,228 B2
(45) Date of Patent: Dec. 30, 2025

(54) METHOD AND DEVICE FOR STORING INFORMATION IN MOLECULE

(71) Applicant: Digicodon Technologies Co., Ltd., Hangzhou (CN)

(72) Inventors: Lushuai Zhang, Hangzhou (CN); Shuo Jiang, Hangzhou (CN)

(73) Assignee: Digicodon Technologies Co., Ltd., Hangzhou (CN)

( * ) Notice: Subject to any disclaimer, the term of this patent is extended or adjusted under 35 U.S.C. 154(b) by 0 days.

(21) Appl. No.: 18/726,848

(22) PCT Filed: Mar. 8, 2022

(86) PCT No.: PCT/CN2022/079689
§ 371 (c)(1),
(2) Date: Jul. 5, 2024

(87) PCT Pub. No.: WO2023/130562
PCT Pub. Date: Jul. 13, 2023

(65) Prior Publication Data

US 2025/0086104 A1    Mar. 13, 2025

(30) Foreign Application Priority Data

Jan. 5, 2022 (CN) .......................... 202210009421.5

(51) Int. Cl.
*G06F 12/00* (2006.01)
*G06F 12/02* (2006.01)
*G16B 50/30* (2019.01)

(52) U.S. Cl.
CPC ........... *G06F 12/023* (2013.01); *G16B 50/30* (2019.02)

(58) Field of Classification Search
CPC ..... G06F 12/023; G06F 12/06; G06N 99/007; G06N 3/002; G16B 50/30; C12Q 1/686; C12Q 1/6813

See application file for complete search history.

(56) References Cited

U.S. PATENT DOCUMENTS 10,387,301 B2    8/2019  Goldman et al.
11,152,061 B2   10/2021  Predki et al.
(Continued)

FOREIGN PATENT DOCUMENTS

CA    3108400 A1    2/2020
CA    3111930 A1    3/2020
(Continued)

OTHER PUBLICATIONS

JP Office Action for application No. 2024-539896, filed on Jun. 2, 2025.
(Continued)

*Primary Examiner* — Shawn X Gu
(74) *Attorney, Agent, or Firm* — Eschweiler & Potashnik, LLC

(57) ABSTRACT

A method and device for storing information in a molecule. The method comprises: obtaining initial information to be stored, and representing the initial information using a first address code and a first content code; recoding each first address code respectively, to represent one respective first address code using first recoding information with a first preset bit number and a first preset base; determining respective molecular modules according to the first content code and the first recoding information, and combining the determined molecular modules in order, such that a composition corresponds to the initial information.

20 Claims, 9 Drawing Sheets

(56) References Cited

U.S. PATENT DOCUMENTS

| | | |
|---|---|---|
| 11,535,882 B2 | 12/2022 | Fu et al. |
| 11,761,369 B1 | 9/2023 | Sanders et al. |
| 2016/0289669 A1 | 10/2016 | Fan et al. |
| 2019/0311782 A1 | 10/2019 | Dai et al. |
| 2020/0185057 A1 | 6/2020 | Leake et al. |
| 2020/0211677 A1 | 7/2020 | Fan |
| 2021/0348214 A1* | 11/2021 | Roquet .................. G06N 3/123 |
| 2022/0382480 A1 | 12/2022 | Yang et al. |

FOREIGN PATENT DOCUMENTS

| | | |
|---|---|---|
| CN | 104520864 A | 4/2015 |
| CN | 107406888 A | 11/2017 |
| CN | 107407691 A | 11/2017 |
| CN | 110706751 A | 1/2020 |
| CN | 111600609 A | 8/2020 |
| CN | 111858507 A | 10/2020 |
| CN | 112288089 A | 1/2021 |
| CN | 112382340 A | 2/2021 |
| CN | 112433986 A | 3/2021 |
| CN | 112711935 A | 4/2021 |
| CN | 112989405 A | 6/2021 |
| CN | 113314187 A | 8/2021 |
| CN | 113687976 A | 11/2021 |
| JP | 2020507168 A | 3/2020 |
| JP | 2020534633 A | 11/2020 |
| WO | 2018094115 A1 | 5/2018 |
| WO | 2019020059 A1 | 1/2019 |
| WO | 2023130562 A1 | 7/2023 |

OTHER PUBLICATIONS

Written Opinion of The International Searching Authority dated Sep. 27, 2022, for International Application No. PCT/CN2022/079689.

Teng Yue et al. "Principle and Progress of DNA Data Storage." DOI: 10.16476/j.pibb.2020-0224. Published Oct. 16, 2020.

Yiming Dong et al. "Information Science; DNA Storage: research landscape and future prospects." Downloaded from http://academic.oup.com/insr/advance-article-abstract/doi/10.1093/nsr/nwaa007/5711038 on Feb. 5, 2020.

Yaya Hao et al. "Data Storage based on DNA" https://onlinelibrary.wiley.com/doi/full/10.1002/sstr.202000046.

International Search Report dated Sep. 6, 2022, for International Application No. PCT/CN2022/079689.

Extended European Search Report dated Nov. 6, 2025 in conncetion with Application Serial No. 22918028.6.

* cited by examiner

| Storage form | | | | | | |
|---|---|---|---|---|---|---|
| Molecular module A2 | Molecular module A3 | Molecular module A5 | Molecular module A3 | Molecular module A6 | Molecular module A3 | Molecular module A7 |
| Molecular module A1 | Molecular module A3 | Molecular module A5 | Molecular module A3 | Molecular module A6 | Molecular module A4 | Molecular module A7 |
| Molecular module A1 | Molecular module A3 | Molecular module A5 | Molecular module A4 | Molecular module A6 | Molecular module A3 | Molecular module A7 |
| Molecular module A2 | Molecular module A3 | Molecular module A5 | Molecular module A4 | Molecular module A6 | Molecular module A4 | Molecular module A7 |
| Molecular module A2 | Molecular module A4 | Molecular module A5 | Molecular module A3 | Molecular module A6 | Molecular module A3 | Molecular module A7 |
| Molecular module A1 | Molecular module A4 | Molecular module A5 | Molecular module A3 | Molecular module A6 | Molecular module A4 | Molecular module A7 |
| Molecular module A1 | Molecular module A4 | Molecular module A5 | Molecular module A4 | Molecular module A6 | Molecular module A3 | Molecular module A7 |
| Molecular module A1 | Molecular module A4 | Molecular module A5 | Molecular module A4 | Molecular module A6 | Molecular module A4 | Molecular module A7 |

FIG. 5

METHOD AND DEVICE FOR STORING INFORMATION IN MOLECULE

CROSS-REFERENCE TO RELATED APPLICATIONS

This application is a US national stage of International Application No. PCT/CN2022/079689, filed on Mar. 8, 2022, which claims priority to Chinese patent application No. 202210009421.5, entitled "METHOD AND DEVICE FOR STORING INFORMATION IN MOLECULE", filed on Jan. 5, 2022. Both of the aforementioned applications are hereby incorporated by reference in their entireties.

TECHNICAL FIELD

The present disclosure relates to a field of storage technology, in particular, to a method and a device for storing information in a molecule.

BACKGROUND

With the substantial development of information technology, people's demand for data storage is increasing rapidly. Traditional data storage media include hard disks, flash memories, magnetic tapes, optical disks, etc., which have problems such as low storage density, short storage time, and high energy consumption. In order to achieve higher storage density and more reliable storage effect, a method and a device related to storing information in a molecule have been proposed at present. Taking data storage using a DNA molecule as an example, its storage density can theoretically reach more than $10^6$ to $10^7$ times that of the traditional storage media, reducing the cost of data storage operation and maintenance by orders of magnitude. In addition, the DNA is very stable, and data therein can be preserved for more than a thousand years under dry and low-temperature conditions. In addition, the DNA storage also has great advantages over traditional storage manners in terms of carbon emissions and energy consumption, data security, portability, and the like. However, there is still a lack of a suitable molecular storage-based method and device that can be integrated with a computer system in performances such as writing speed, cost, and the like. For example, the writing speed and the cost of storage method based on the DNA synthesis are several orders of magnitude behind the traditional storage method, and there are significant limitations. Therefore, there is a need for improving the existing molecular storage technology.

SUMMARY

One of the objects of the present disclosure is to provide a method and a device for storing information in a molecule.

According to a first aspect of the present disclosure, there is provided a method for storing information in a molecule, comprising:
  obtaining initial information to be stored, and representing the initial information using a first address code and a first content code, wherein each position in the initial information is represented by a first address code one-to-one corresponding to the position respectively, and a content at each position of the initial information is represented by a respective first content code respectively;
  recoding each first address code respectively, to represent one respective first address code using first recoding information with a first preset bit number and a first preset base;
  determining respective molecular modules according to the first content code and the first recoding information; and
  combining the determined molecular modules in order, such that a composition corresponds to the initial information.

In some embodiments, obtaining the initial information to be stored, and representing the initial information using the first address code and the first content code comprises:
  obtaining the initial information;
  determining a unit bit number of a content at one position in the initial information corresponding to one first address code, wherein the unit bit number of the content at each position in the initial information is equal to each other;
  when a total bit number of the initial information is an integer multiple of the unit bit number, dividing the initial information into one or more initial information fragments;
  when the total bit number of the initial information is not an integer multiple of the unit bit number, padding the initial information so that the total bit number of the resulting padded initial information is an integer multiple of the unit bit number, and dividing the padded initial information into one or more initial information fragments;
  wherein a bit number of each initial information fragment is the unit bit number.

In some embodiments, padding the initial information comprises:
  supplementing a placeholder content in the initial information, wherein the placeholder content and a non-placeholder content in the initial information correspond to different molecular modules respectively.

In some embodiments, the initial information further comprises an error correction content.

In some embodiments, a sum of the first preset bit number and the first preset base is less than a maximum possible species number of different values of the first address code; and
  the first preset base to a power of the first preset bit number is greater than the maximum possible species number of different values of the first address code.

In some embodiments, determining the respective molecular modules according to the first content code and the first recoding information comprises:
  determining different molecular modules for the first content code and the first recoding information respectively.

In some embodiments, determining the respective molecular modules according to the first content code and the first recoding information comprises:
  determining different molecular modules for contents on different bits in the first recoding information respectively; and
  determining different molecular modules for different contents on a same bit in the first recoding information respectively.

In some embodiments, determining the respective molecular modules according to the first content code and the first recoding information comprises:
  for each first recoding information, representing the first recoding information using a second address code and a second content code, wherein each position in the first recoding information is represented by a second address code one-to-one corresponding to the position respectively, and a content at each position in the first recoding information is represented by a respective second content code respectively; and determining the respective molecular modules according to the first content code, the second address code and the second content code.

In some embodiments, determining the respective molecular modules according to the first content code, the second address code and the second content code comprises:

determining different molecular modules for the first content code, the second address code and the second content code respectively.

In some embodiments, determining the respective molecular modules according to the first content code, the second address code and the second content code comprises:

determining different molecular modules for the first content codes with different values respectively; or determining different molecular modules for the second address codes with different values respectively; or determining different molecular modules for the second content codes with different values respectively.

In some embodiments, determining the respective molecular modules according to the first content code, the second address code and the second content code comprises:

when the first content code has Nc1 different values, determining different molecular modules for the first content codes with (Nc1−1) different values respectively, and making the first content code with one remaining value not correspond to any molecular module; or when the second address code has Na2 different values, determining different molecular modules for the second address codes with (Na2−1) different values respectively, and making the second address code with one remaining value not correspond to any molecular module; or when the second content code has Nc2 different values, determining different molecular modules for the second content codes with (Nc2−1) different values respectively, and making the second content code with one remaining value not correspond to any molecular module.

In some embodiments, determining the respective molecular modules according to the first content code, the second address code and the second content code comprises:

determining different molecular modules for different value combinations of two of the first content code, the second address code and the second content code respectively.

In some embodiments, determining the respective molecular modules according to the first content code, the second address code and the second content code comprises:

determining different molecular modules for different value combinations of the second address code and the second content code respectively.

In some embodiments, determining the respective molecular modules according to the first content code, the second address code and the second content code comprises:

when the combination of the second address code and the second content code has Nac2 different values, determining different molecular modules for the combinations of the second address codes and the second content codes with (Nac2−1) different values respectively, and making the combination of the second address code and the second content code with one remaining value not correspond to any molecular module.

In some embodiments, combining the determined molecular modules in order, such that the composition corresponds to the initial information comprises:

forming terminal portions corresponding to a preset order at connection ends of the determined molecular modules; and mixing the molecular modules formed with the respective terminal portions to produce the composition corresponding to the initial information.

In some embodiments, a molecular fragment serving as the terminal portion is a part of the respective molecular module; or the molecular fragment serving as the terminal portion is added to the respective molecular module after the molecular module is determined.

In some embodiments, mixing the molecular modules formed with the respective terminal portions to produce the composition corresponding to the initial information comprises at least one of:

combining the determined molecular modules in order using a ligase;

combining the determined molecular modules in order using a linker disposed at the end of the molecular module; or combining the determined molecular modules in order using a polymerase chain reaction.

In some embodiments, the molecular module comprises at least one of a deoxyribonucleic acid, a ribonucleic acid, a peptide, an organic polymer, an organic small molecule, a carbon nanomaterial, a non-natural nucleotide, a modified nucleotide, an artificially synthetic nucleotide, an inorganic substance, or spaced molecular fragments.

In some embodiments, various molecular modules are distinguished using at least one of their sequence distributions, sequence lengths, secondary structures, crystalline or amorphous natures, or morphologies.

In some embodiments, an editing distance between different molecular modules is greater than or equal to a preset distance threshold.

According to a second aspect of the present disclosure, there is provided a method for storing information in a molecule, comprising:

obtaining initial information to be stored, and representing the initial information using a first address code and a first content code, wherein each position in the initial information is represented by a first address code one-to-one corresponding to the position respectively, and a content at each position of the initial information is represented by a respective first content code respectively;

recoding each first content code respectively, to represent one respective first content code using second recoding information with a second preset bit number and a second preset base;

determining respective molecular modules according to the first address code and the second recoding information; and combining the determined molecular modules in order, such that a composition corresponds to the initial information.

In some embodiments, obtaining the initial information to be stored, and representing the initial information using the first address code and the first content code comprises:

obtaining the initial information;

determining a unit bit number of a content at one position in the initial information corresponding to one first address code, wherein the unit bit number of content at each position in the initial information is equal to each other;

when a total bit number of the initial information is an integer multiple of the unit bit number, dividing the initial information into one or more initial information fragments;

when the total bit number of the initial information is not an integer multiple of the unit bit number, padding the initial information so that the total bit number of the resulting padded initial information is an integer multiple of the unit bit number, and dividing the padded initial information into one or more initial information fragments;

wherein a bit number of each initial information fragment is the unit bit number.

In some embodiments, padding the initial information comprises:

supplementing a placeholder content in the initial information, wherein the placeholder content and a non-placeholder content in the initial information correspond to different molecular modules respectively.

In some embodiments, the initial information further comprises an error correction content.

In some embodiments, a sum of the second preset bit number and the second preset base is less than a maximum possible species number of different values of the first content code; and the second preset base to a power of the second preset bit number is greater than the maximum possible species number of different values of the first content code.

In some embodiments, determining the respective molecular modules according to the first address code and the second recoding information comprises:

determining different molecular modules for the first address code and the second recoding information respectively.

In some embodiments, determining the respective molecular modules according to the first address code and the second recoding information comprises:

determining different molecular modules for contents on different bits in the second recoding information respectively; and determining different molecular modules for different contents on a same bit in the second recoding information respectively.

In some embodiments, determining the respective molecular modules according to the first address code and the second recoding information comprises:

for each second recoding information, representing the second recoding information using a third address code and a third content code, wherein each position in the second recoding information is represented by a third address code one-to-one corresponding to the position respectively, and a content at each position in the second recoding information is represented by a respective third content code respectively; and determining the respective molecular modules according to the first address code, the third address code and the third content code.

In some embodiments, determining the respective molecular modules according to the first address code, the third address code and the third content code comprises:

determining different molecular modules for the first address code, the third address code and the third content code respectively.

In some embodiments, determining the respective molecular modules according to the first address code, the third address code and the third content code comprises:

determining different molecular modules for the first address codes with different values respectively; or determining different molecular modules for the third address codes with different values respectively; or determining different molecular modules for the third content codes with different values respectively.

In some embodiments, determining the respective molecular modules according to the first address code, the third address code and the third content code comprises:

when the first address code has Na1 different values, determining different molecular modules for the first address codes with (Na1−1) different values respectively, and making the first address code with one remaining value not correspond to any molecular module; or when the third address code has Na3 different values, determining different molecular modules for the third address codes with (Na3−1) different values respectively, and making the third address code with one remaining value not correspond to any molecular module; or when the third content code has Nc3 different values, determining different molecular modules for the third content codes with (Nc3−1) different values respectively, and making the third content code with one remaining value not correspond to any molecular module.

In some embodiments, determining the respective molecular modules according to the first address code, the third address code and the third content code comprises:

determining different molecular modules for different value combinations of two of the first address code, the third address code and the third content code respectively.

In some embodiments, determining the respective molecular modules according to the first address code, the third address code and the third content code comprises:

determining different molecular modules for different value combinations of the third address code and the third content code respectively.

In some embodiments, determining the respective molecular modules according to the first address code, the third address code and the third content code comprises:

when the combination of the third address code and the third content code has Nac3 different values, determining different molecular modules for the combinations of the third address codes and the third content codes with (Nac3−1) different values respectively, and making the combination of the third address code and the third content code with one remaining value not correspond to any molecular module.

In some embodiments, combining the determined molecular modules in order, such that the composition corresponds to the initial information comprises:

forming terminal portions corresponding to a preset order at connection ends of the determined molecular modules; and mixing the molecular modules formed with the respective terminal portions to produce the composition corresponding to the initial information.

In some embodiments, a molecular fragment serving as the terminal portion is a part of the respective molecular module; or the molecular fragment serving as the terminal portion is added to the respective molecular module after the molecular module is determined.

In some embodiments, mixing the molecular modules formed with the respective terminal portions to produce the composition corresponding to the initial information comprises at least one of:

combining the determined molecular modules in order using a ligase;

combining the determined molecular modules in order using a linker disposed at the end of the molecular module; or combining the determined molecular modules in order using a polymerase chain reaction.

In some embodiments, the molecular module comprises at least one of a deoxyribonucleic acid, a ribonucleic acid, a peptide, an organic polymer, an organic small molecule, a carbon nanomaterial, a non-natural nucleotide, a modified nucleotide, an artificially synthetic nucleotide, an inorganic substance, or spaced molecular fragments.

In some embodiments, various molecular modules are distinguished using at least one of their sequence distributions, sequence lengths, secondary structures, crystalline or amorphous natures, or morphologies.

In some embodiments, an editing distance between different molecular modules is greater than or equal to a preset distance threshold.

According to a third aspect of the present disclosure, there is provided a method for storing information in a molecule, comprising:

obtaining initial information to be stored, and representing the initial information using a first address code and a first content code, wherein each position in the initial information is represented by a first address code one-to-one corresponding to the position respectively, and a content at each position of the initial information is represented by a respective first content code respectively;

recoding each first address code and each first content code respectively, to represent one respective first address code using first recoding information with a first preset bit number and a first preset base, and to represent one respective first content code using second recoding information with a second preset bit number and a second preset base;

determining respective molecular modules according to the first recoding information and the second recoding information; and combining the determined molecular modules in order, such that a composition corresponds to the initial information.

In some embodiments, obtaining the initial information to be stored, and representing the initial information using the first address code and the first content code comprises:

obtaining the initial information;

determining a unit bit number of a content at one position in the initial information corresponding to one first address code, wherein the unit bit number of the content at each position in the initial information is equal to each other;

when a total bit number of the initial information is an integer multiple of the unit bit number, dividing the initial information into one or more initial information fragments;

when the total bit number of the initial information is not an integer multiple of the unit bit number, padding the initial information so that the total bit number of the resulting padded initial information is an integer multiple of the unit bit number, and dividing the padded initial information into one or more initial information fragments;

wherein a bit number of each initial information fragment is the unit bit number.

In some embodiments, padding the initial information comprises:

supplementing a placeholder content in the initial information, wherein the placeholder content and a non-placeholder content in the initial information correspond to different molecular modules respectively.

In some embodiments, the initial information further comprises an error correction content.

In some embodiments, a sum of the first preset bit number and the first preset base is less than a maximum possible species number of different values of the first address code, and a sum of the second preset bit number and the second preset base is less than a maximum possible species number of different values of the first content code; and the first preset base to a power of the first preset bit number is greater than the maximum possible species number of different values of the first address code, and the second preset base to a power of the second preset bit number is greater than the maximum possible species number of different values of the first content code.

In some embodiments, determining the respective molecular modules according to the first recoding information and the second recoding information comprises:

determining different molecular modules for the first recoding information and the second recoding information respectively.

In some embodiments, determining the respective molecular modules according to the first recoding information and the second recoding information comprises:

determining different molecular modules for contents on different bits in the first recoding information respectively, and determining different molecular modules for different contents on a same bit in the first recoding information respectively; and/or determining different molecular modules for contents on different bits in the second recoding information respectively, and determining different molecular modules for different contents on a same bit in the second recoding information respectively.

In some embodiments, determining the respective molecular modules according to the first recoding information and the second recoding information comprises:

for each first recoding information, representing the first recoding information using a second address code and a second content code, wherein each position in the first recoding information is represented by a second address code one-to-one corresponding to the position respectively, and a content at each position in the first recoding information is represented by a respective second content code respectively; and determining the respective molecular modules according to the second address code and the second content code; and/or for each second recoding information, representing the second recoding information using a third address code and a third content code, wherein each position in the second recoding information is represented by a third address code one-to-one corresponding to the position respectively, and a content at each position in the second recoding information is represented by a respective third content code respectively; and determining the respective molecular modules according to the third address code and the third content code.

In some embodiments, determining the respective molecular modules according to the first recoding information and the second recoding information comprises:

determining different molecular modules for the second address code, the second content code, the third address code and the third content code respectively.

In some embodiments, determining the respective molecular modules according to the first recoding information and the second recoding information comprises:

determining different molecular modules for the second address codes with different values respectively; or determining different molecular modules for the second content codes with different values respectively; or determining different molecular modules for the third address codes with different values respectively; or determining different molecular modules for the third content codes with different values respectively.

In some embodiments, determining the respective molecular modules according to the first recoding information and the second recoding information comprises:

when the second address code has Na2 different values, determining different molecular modules for the second address codes with (Na2−1) different values respectively, and making the second address code with one remaining value not correspond to any molecular module; or when the second content code has Nc2 different values, determining different molecular modules for the second content codes with (Nc2−1) different values respectively, and making the second content code with one remaining value not correspond to any molecular module; or when the third address code has Na3 different values, determining different molecular modules for the third address codes with (Na3−1) different values respectively, and making the third address code with one remaining value not correspond to any molecular module; or when the third content code has Nc3 different values, determining different molecular modules for the third content codes with (Nc3−1) different values respectively, and making the third content code with one remaining value not correspond to any molecular module.

In some embodiments, determining the respective molecular modules according to the first recoding information and the second recoding information comprises:

determining different molecular modules for different value combinations of two or three of the second address code, the second content code, the third address code and the third content code respectively.

In some embodiments, determining the respective molecular modules according to the first recoding information and the second recoding information comprises:

determining different molecular modules for different value combinations of the second address codes and the second content codes respectively; or determining different molecular modules for different value combinations of the third address codes and the third content codes respectively.

In some embodiments, determining the respective molecular modules according to the first recoding information and the second recoding information comprises:

when the combination of the second address code and the second content code has Nac2 different values, determining different molecular modules for the combinations of the second address codes and the second content codes with (Nac2−1) different values respectively, and making the combination of the second address code and the second content code with one remaining value not correspond to any molecular module; or when the combination of the third address code and the third content code has Nac3 different values, determining different molecular modules for the combinations of the third address codes and the third content codes with (Nac3−1) different values respectively, and making the combination of the third address code and the third content code with one remaining value not correspond to any molecular module.

In some embodiments, combining the determined molecular modules in order, such that the composition corresponds to the initial information comprises:

forming terminal portions corresponding to a preset order at connection ends of the determined molecular modules; and mixing the molecular modules formed with the respective terminal portions to produce the composition corresponding to the initial information.

In some embodiments, a molecular fragment serving as the terminal portion is a part of the respective molecular module; or the molecular fragment serving as the terminal portion is added to the respective molecular module after the molecular module is determined.

In some embodiments, mixing the molecular modules formed with the respective terminal portions to produce the composition corresponding to the initial information comprises at least one of:

combining the determined molecular modules in order using a ligase;

combining the determined molecular modules in order using a linker disposed at the end of the molecular module; or combining the determined molecular modules in order using a polymerase chain reaction.

In some embodiments, the molecular module comprises at least one of a deoxyribonucleic acid, a ribonucleic acid, a peptide, an organic polymer, an organic small molecule, a carbon nanomaterial, a non-natural nucleotide, a modified nucleotide, an artificially synthetic nucleotide, an inorganic substance, or spaced molecular fragments.

In some embodiments, various molecular modules are distinguished using at least one of their sequence distributions, sequence lengths, secondary structures, crystalline or amorphous natures, or morphologies.

In some embodiments, an editing distance between different molecular modules is greater than or equal to a preset distance threshold.

According to a fourth aspect of the present disclosure, there is provided a device for storing information in a molecule, comprising:

an obtaining unit configured to obtain initial information to be stored;

a coding unit configured to perform following operations:

representing the initial information using a first address code and a first content code, wherein each position in the initial information is represented by a first address code one-to-one corresponding to the position respectively, and a content at each position of the initial information is represented by a respective first content code respectively;

recoding each first address code respectively, to represent one respective first address code using first recoding information with a first preset bit number and a first preset base; and determining respective molecular modules according to the first content code and the first recoding information.

In some embodiments, the device further comprises:

a writer unit configured to combine the determined molecular modules in order, such that a composition corresponds to the initial information.

According to a fifth aspect of the present disclosure, there is provided a device for storing information in a molecule, comprising:

an obtaining unit configured to obtain initial information to be stored;

a coding unit configured to perform following operations:

representing the initial information using a first address code and a first content code, wherein each position in the initial information is represented by a first address code one-to-one corresponding to the position respectively, and a content at each position of the initial information is represented by a respective first content code respectively;

recoding each first content code respectively, to represent one respective first content code using second recoding information with a second preset bit number and a second preset base; and determining respective molecular modules according to the first address code and the second recoding information.

In some embodiments, the device further comprises:

a writer unit configured to combine the determined molecular modules in order, such that a composition corresponds to the initial information.

According to a sixth aspect of the present disclosure, there is provided a device for storing information in a molecule, comprising:

an obtaining unit configured to obtain initial information to be stored;

a coding unit configured to perform following operations:

representing the initial information using a first address code and a first content code, wherein each position in the initial information is represented by a first address code one-to-one corresponding to the position respectively, and a content at each position of the initial information is represented by a respective first content code respectively;

recoding each first address code and each first content code respectively, to represent one respective first address code using first recoding information with a first preset bit number and a first preset base, and to represent one respective first content code using second recoding information with a second preset bit number and a second preset base; and determining respective molecular modules according to the first recoding information and the second recoding information.

In some embodiments, the device further comprises:

a writer unit configured to combine the determined molecular modules in order, such that a composition corresponds to the initial information.

Other features and their advantages of the present disclosure will become more apparent from the following detailed description of exemplary embodiments of the present disclosure with reference to the accompanying drawings.

BRIEF DESCRIPTION OF THE DRAWINGS

The accompanying drawings, which constitute a part of the specification, illustrate embodiments of the disclosure, and together with the specification, serve to explain principles of the disclosure.

The present disclosure may be more clearly understood from the following detailed description with reference to the accompanying drawings, in which:

FIG. 5 shows a storage form for storing information in a molecule in another specific example of the present disclosure;

Figure 1:
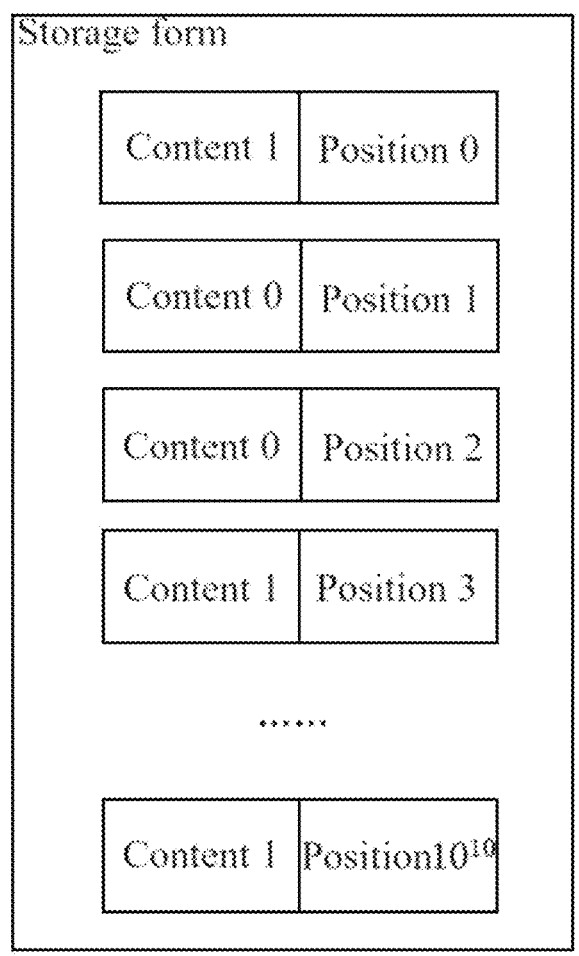
FIG. 1 shows a storage form for storing information in a molecule.

Note that in implementations described below, a same reference numeral is sometimes commonly used among different drawings to represent a same part or a part with a same function, and repeated description thereof is omitted. In some instances, similar numbers and letters are used for referring to similar items such that once an item is defined in a drawing, it does not require further discussion in subsequent drawings.

In order to facilitate understanding, positions, dimensions, ranges, and so on of various structures shown in the drawings and the like may sometimes not represent actual positions, dimensions, ranges, and so on. Therefore, the present disclosure is not limited to the positions, dimensions, ranges, and so on disclosed in the drawings and the like.

DETAILED DESCRIPTION

Various exemplary embodiments of the present disclosure will be described in detail below with reference to the accompanying drawings. It should be noted that relative arrangements of components and steps, numerical expressions, and numerical values set forth in these embodiments do not limit the scope of the disclosure unless otherwise specifically stated.

The following description of at least one exemplary embodiment is merely illustrative in nature and is in no way intended to limit the disclosure, or its application or usage. That is, the structures and methods herein are shown by way of example to illustrate different embodiments of the structures and the methods in the present disclosure. However, those skilled in the art will understand that they are merely illustrative of exemplary ways in which the disclosure may be practiced, instead of exhaustive. Furthermore, the drawings are not necessarily to be drawn in scale, and some features may be exaggerated to illustrate details of particular components.

Techniques, methods and devices known to those of ordinary skill in the relevant art may not be discussed in detail, but where appropriate, such techniques, methods and devices should be regarded as part of the granted specification.

In all examples shown and discussed herein, any specific values are to be construed as illustrative only and not as limitations. Accordingly, other examples of the exemplary embodiments may have different values.

In the molecular storage technology, different molecular modules may be used for representing different contents of information to be stored, and the complete information to be stored may be represented by synthesizing or combining these molecular modules. For example, for a piece of binary information shown in Table 1 below, it has a total of $10^{10}$ bits, and the value of the content on each bit may be 0 or 1. Accordingly, two different molecular modules may be used for representing the content 0 and the content 1 respectively, and $10^{10}$ different molecular modules may be used for representing $10^{10}$ addresses respectively, by synthesizing or combining the above $(2+10^{10})$ molecular modules in accordance with the preset rule, the piece of information shown in Table 1 may be represented as a storage form shown in FIG. 1, wherein each small rectangular block represents one kind of molecular module.

TABLE 1

| content | 1 | 0 | 0 | 1 | 1 | 0 | 0 | 0 | 1 | 0 | ... | 1 |
|---|---|---|---|---|---|---|---|---|---|---|---|---|
| address | 0 | 1 | 2 | 3 | 4 | 5 | 6 | 7 | 8 | 9 | ... | $10^{10}$ |

However, it can be understood that a molecular module library formed by $10^{10}$ magnitude of different molecular modules for storing information will be very large, which is very difficult to be implemented, and it is also very difficult to synthesize or combine these molecular modules, which makes it very difficult to write information into the molecule. In addition, when reading the information, it may involve analyzing and identifying $10^{10}$ magnitude of different molecular modules, which is also very difficult.

Figure 2:
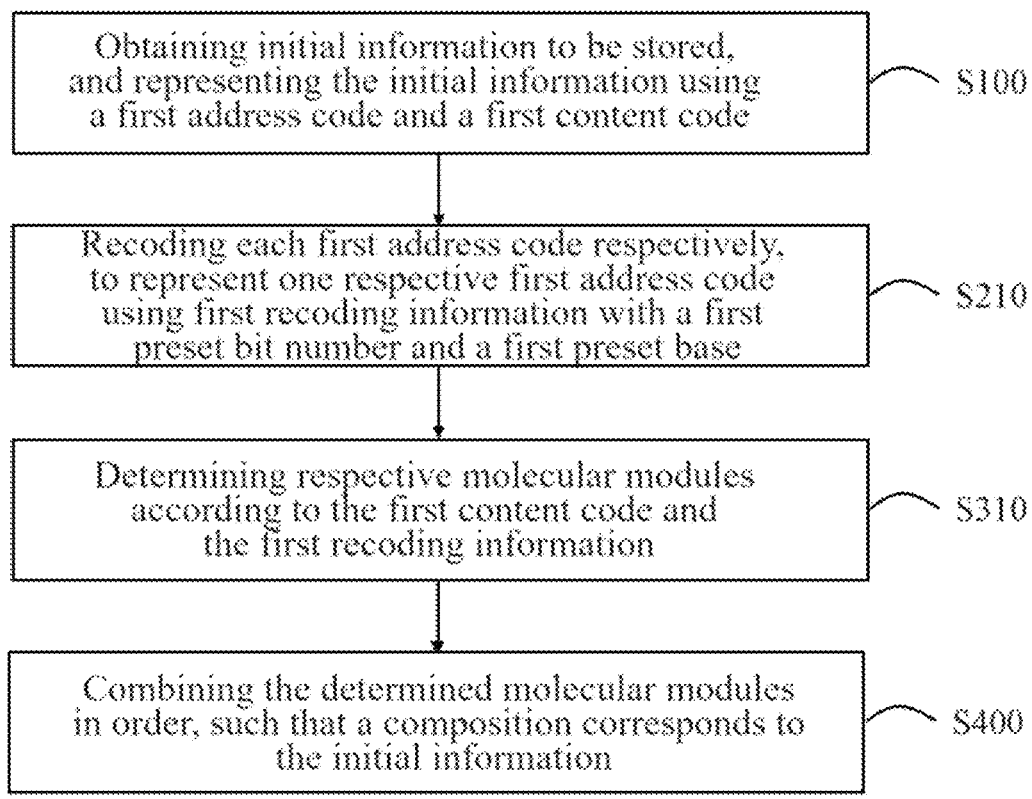
FIG. 2 shows a schematic flowchart of a method for storing information in a molecule according to an exemplary embodiment of the present disclosure.
Figure 6:
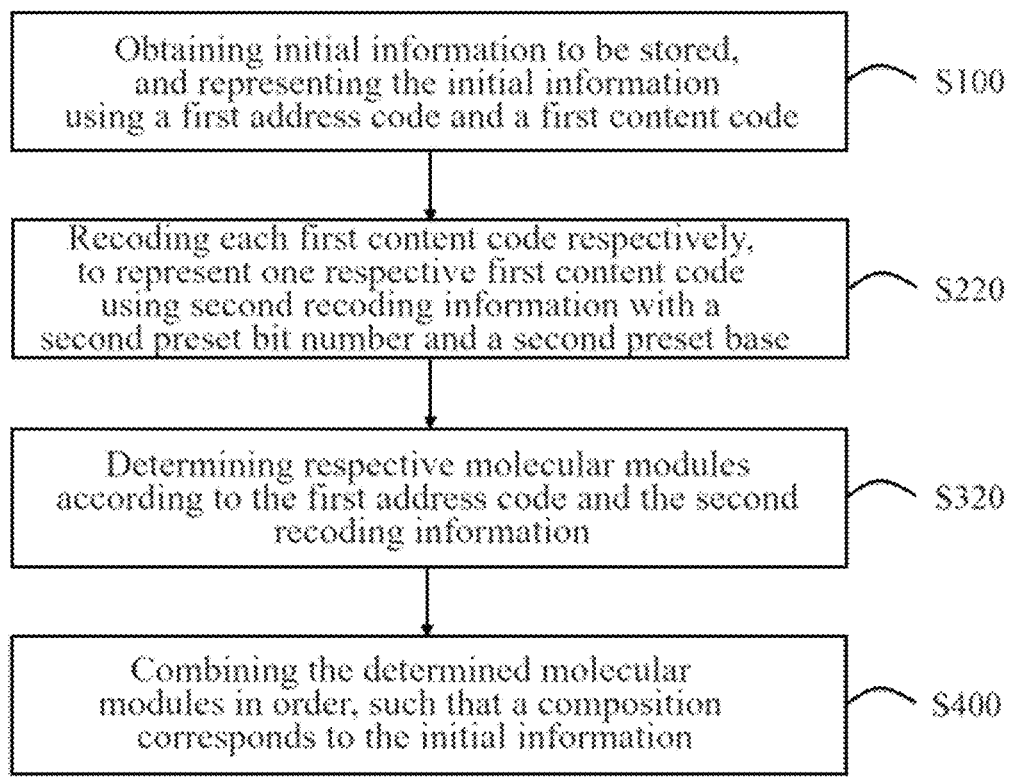
FIG. 6 shows a schematic flowchart of a method for storing information in a molecule according to another exemplary embodiment of the present disclosure.
Figure 7:
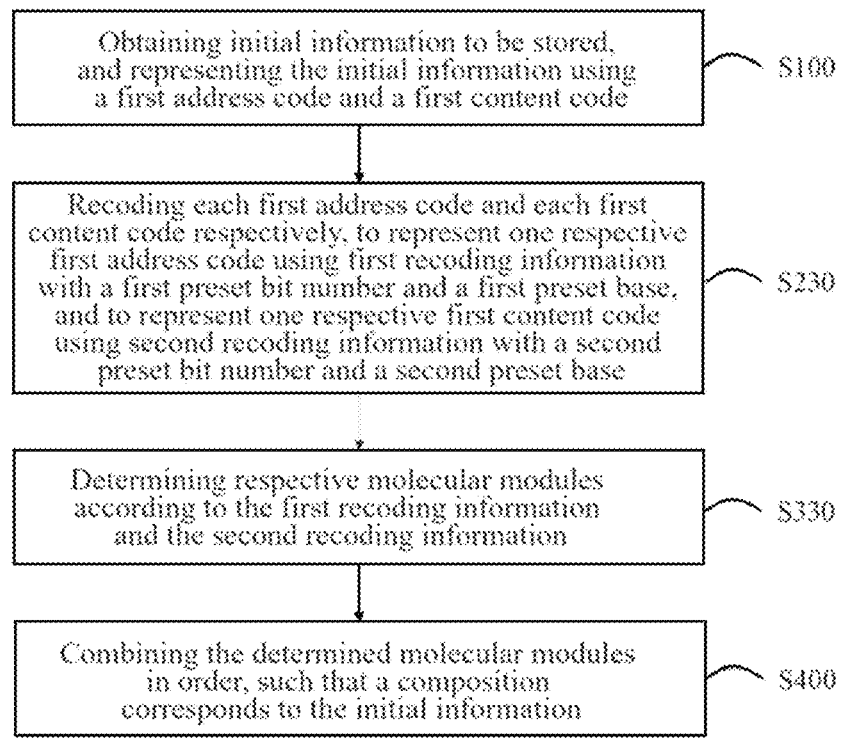
FIG. 7 shows a schematic flowchart of a method for storing information in a molecule according to yet another exemplary embodiment of the present disclosure.

In order to solve the above problems, the present disclosure proposes a method for storing information in a molecule. By recoding the initial information to be stored, the species number of the molecular modules required is greatly reduced, thereby reducing the difficulty and improving the efficiency of reading and writing. As shown in FIGS. 2, 6 and 7, in an exemplary embodiment of the present disclosure, the method may include:

step S100, obtaining initial information to be stored, and representing the initial information using a first address code and a first content code.

The initial information may include various forms of information, such as text information, picture information, audio information or video information, and the like. In information technology, the above various forms of information may be converted into, for example, the binary coding and the like conveniently. In the following, the technical solution of the present disclosure will be set forth in detail by taking the initial information being the binary coded information as an example. However, it can be understood that the initial information can be the information coded in other bases as needed.

In addition, in some embodiments, the initial information may further include a preset error correction content. For example, the error correction function may be achieved by introducing a linear erasure code (for example, a RS-code) as the error correction content into the original information. The linear erasure code may be calculated based on the original information. In a specific example, assuming that the original information is "110111101", then in a calculation manner, the resulting linear erasure code is "010", then the initial information containing the error correction content can be represented as "110111101010", wherein the calculated linear erasure code "010" is added to the tail of the original information. It can be understood that the error correction content can also be obtained in other ways and can be added at another position relative to the original information, which is not limited herein.

Furthermore, the obtained initial information may be represented using the first address code and the first content code, wherein each position in the initial information may be represented by the first address code one-to-one corresponding to the position respectively, and the content at each position of the initial information may be represented by the respective first content code respectively.

Figure 3:
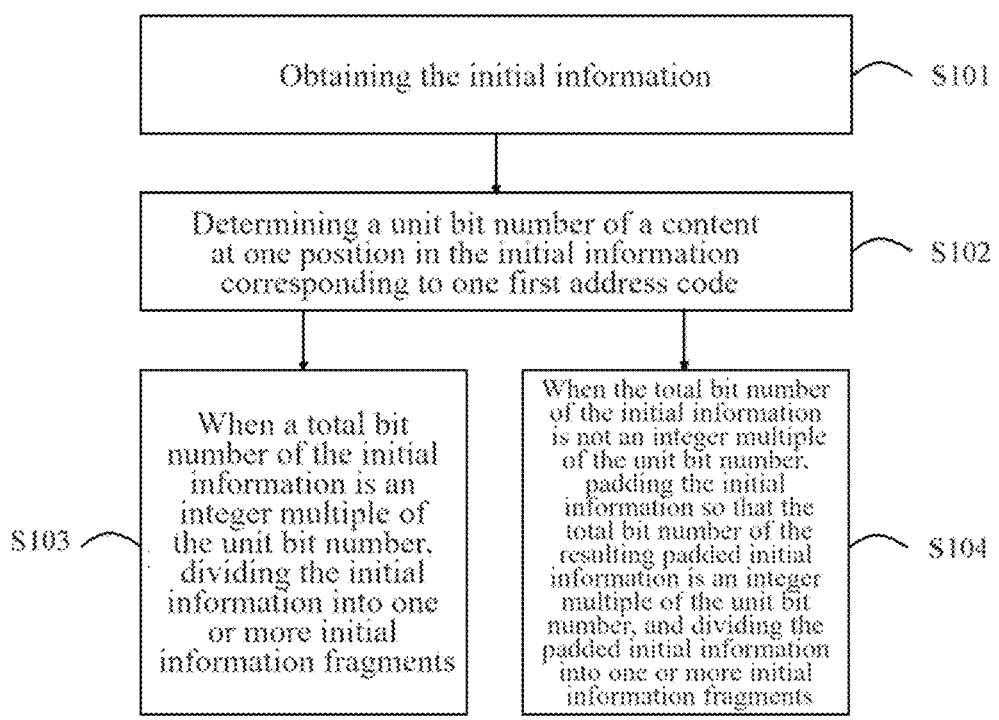
FIG. 3 shows a schematic flowchart of step S100 in a method for storing information in a molecule according to an exemplary embodiment of the present disclosure.

In some embodiments, as shown in FIG. 3, obtaining the initial information to be stored and representing the initial information using the first address code and the first content code may include:

step S101, obtaining the initial information;

step S102, determining a unit bit number of a content at one position in the initial information corresponding to one first address code;

step S103, when a total bit number of the initial information is an integer multiple of the unit bit number, dividing the initial information into one or more initial information fragments;

step S104, when the total bit number of the initial information is not an integer multiple of the unit bit number, padding the initial information so that the total bit number of the resulting padded initial information is an integer multiple of the unit bit number, and dividing the padded initial information into one or more initial information fragments.

The unit bit number of the content at each position in the initial information is equal to each other, and a bit number of each initial information fragment is the unit bit number.

That is, when the initial information is represented using the first address code and the first content code, the initial information is divided into one or more initial information fragments each having the unit bit number, and each initial information fragment is given a respective first address code and a first content code for subsequent processing.

When the total bit number in the initial information is not an integer multiple of the unit bit number, a placeholder content can be supplemented to the initial information, wherein the placeholder content and a non-placeholder content in the initial information may correspond to different molecular modules respectively. In particular, the placeholder content may be supplemented at one or more places at the head, the tail and the middle of the initial information (In some embodiments, the placeholder content may be represented using "0". But it should be noted that, the "0" for padding is different from the original "0" in the initial information, accordingly, different molecular modules are used for representing these two different "0"s. Herein, "0" as the placeholder content is underlined). Since the placeholder content and the non-placeholder content in the initial information correspond to different molecular modules respectively, they can be easily distinguished when reading the information. For example, if the initial information is "1001100010110001" and the unit bit number is 3, that is, when the total bit number 16 of the initial information is not an integer multiple of the unit bit number 3, the placeholder content may be supplemented to the head of the initial information, and the resulting padded initial information is "001001100010110001". Alternatively, the placeholder content may be supplemented at the tail of the initial information, and the resulting padded initial information may be represented as "100110001011000100". In addition, it can be understood that in some embodiments, when other manners may be used for distinguishing the placeholder content from the non-placeholder content (For example, one or more "0"s located at the head of the information may be directly regarded as the placeholder content(s)), the placeholder content and the non-placeholder content may also be represented using the same molecular module.

The unit bit number, or in other words, the different ways of dividing the initial information, may be determined as needed. For example, for the initial information "1001100010110001", it may be divided into different initial information fragments as shown in Table 2 to Table 8 below:

TABLE 2

| | First content code | | | | | | | | | | | | | | | |
|---|---|---|---|---|---|---|---|---|---|---|---|---|---|---|---|---|
| | 1 | 0 | 0 | 1 | 1 | 0 | 0 | 0 | 1 | 0 | 1 | 1 | 0 | 0 | 0 | 1 |
| first address code | 0 | 1 | 2 | 3 | 4 | 5 | 6 | 7 | 8 | 9 | 10 | 11 | 12 | 13 | 14 | 15 |

In the specific example shown in Table 2, the unit bit number of the initial information fragment is 1. The first address codes may include 16 types in total: "0", "1", "2", "3", "4", "5", "6", "7", "8", "9", "10", "11", "12", "13", "14" and "15", and the first content codes may include 2 types in total: "0" and "1".

TABLE 3

| First content code | 10 | 01 | 10 | 00 | 10 | 11 | 00 | 01 |
|---|---|---|---|---|---|---|---|---|
| First address code | 0 | 1 | 2 | 3 | 4 | 5 | 6 | 7 |

In the specific example shown in Table 3, the unit bit number of the initial information fragment is 2. The first address codes may include 8 types in total: "0", "1", "2", "3", "4", "5", "6" and "7", and the first content codes may include 4 types in total: "00", "01", "10" and "11".

TABLE 4

| First content code | 001 | 001 | 100 | 010 | 110 | 001 |
|---|---|---|---|---|---|---|
| First address code | 0 | 1 | 2 | 3 | 4 | 5 |

TABLE 5

| First content code | 100 | 110 | 001 | 011 | 000 | 100 |
|---|---|---|---|---|---|---|
| First address code | 0 | 1 | 2 | 3 | 4 | 5 |

In the specific examples shown in Tables 4 and 5, the unit bit number of the initial information fragment is 3. Since the total bit number of the initial information is not an integer multiple of the unit bit number, in Table 4, two "0"s as the placeholder contents are supplemented to the head of the initial information, so that the total bit number of the resulting padded initial information is an integer multiple of the unit bit number to facilitate division. The first address codes may include 6 types in total: "0", "1", "2", "3", "4" and "5", and the respective first content codes may include 4 types in total: "001", "010", "100" and "110". In addition, when other specific initial information is represented in this way, the first content codes may further include one or more of "000", "011", "101" and "111".

In addition, as shown in Table 5, the total bit number of the padded initial information may be made to be an integer multiple of the unit bit number by supplementing the placeholder contents at the tail of the initial information. It should be noted that "0" is used here for representing the placeholder content, but other characters may be used as well to represent the placeholder content, and the "0" used for placeholding has a different meaning from other "0" in the initial information. In subsequent steps, they may be represented using different molecular modules respectively.

TABLE 6

| First content code | 1001 | 1000 | 1011 | 0001 |
|---|---|---|---|---|
| First address code | 0 | 1 | 2 | 3 |

In the specific example shown in Table 6, the unit bit number of the initial information fragment is 4. The first address codes may include 4 types in total: "0", "1", "2" and "3", and the respective first content codes may include "1001", "1000", "1011" and "0001". It can be understood that in other specific examples, the first content codes may further be other four-bit binary numbers, which will not be enumerated here.

TABLE 7

| First content code | 10011000 | 10110001 |
|---|---|---|
| First address code | 0 | 1 |

In the specific example shown in Table 7, the unit bit number of the initial information fragment is 8. The first address codes may include 2 types in total: "0" and "1", and the respective first content codes may include "10011000" and "10110001". It can be understood that in other specific examples, the first content codes may further be other eight-bit binary numbers, which will not be enumerated here.

TABLE 8

| First content code | 1001100010110001 |
|---|---|
| First address code | 0 |

In the specific example shown in Table 8, the unit bit number of the initial information fragment is 16. The first address code may include one type in total: "0", and the respective first content code may include "1001100010110001". It can be understood that in other specific examples, the first content code may further be other sixteen-bit binary numbers, which will not be enumerated here.

In addition, the first address code and the first content code may alternatively be converted into other base systems, such as octal system, decimal system, hexadecimal system, etc.

Returning to FIG. 2, in an exemplary embodiment of the present disclosure, the method for storing the information in the molecule may further include:
  step S210, recoding each first address code respectively, to represent one respective first address code using first recoding information with a first preset bit number and a first preset base;
  step S310, determining respective molecular modules according to the first content code and the first recoding information.

In some embodiments, a sum (B1+S1) of the first preset bit number B1 and the first preset base S1 may be less than a maximum possible species number of different values of the first address code, so as to effectively reduce the total number of the molecular modules required to characterize the first address code. Moreover, the first preset base to a power of the first preset bit number ($S1^{B1}$) may be greater than the maximum possible species number of different values of the first address code of the initial information, so that the first recoding information is able to represent all the first address codes that may appear, to ensure the reliability of coding.

For example, using the 3-bit binary first recoding information, 5 (i.e., 3+2) different molecular modules may be used for representing a total of 8 (i.e., $2^3$) different first address codes; using the 4-bit binary first recoding information, 6 (i.e., 4+2) different molecular modules may be used for representing a total of 16 (i.e., $2^4$) different first address codes; using the 5-bit binary first recoding information, 7 (i.e., 5+2) different molecular modules may be used for representing a total of 32 (i.e., $2^5$) different first address codes; using the 5-bit ternary first recoding information, 8 (i.e., 5+3) different molecular modules may be used for representing a total of 243 (i.e., $3^5$) different first address codes; using the 10-bit decimal first recoding information, 20 (i.e., 10+10) different molecular modules may be used for representing a total of $10^{10}$ different first address codes. As it can be seen, through recoding, when the number of the first address codes that need to be represented increases exponentially, it is only necessary to linearly increase the number of the molecular modules, thus greatly reducing the types of the molecular modules required.

Further, the respective molecular modules may be determined based on the first content code and the first recoding information. In particular, different molecular modules may be determined for the first content code and the first recoding information respectively.

In some embodiments, when determining the respective molecular module for the first recoding information, different molecular modules may be determined for contents on different bits in the first recoding information respectively, and different molecular modules may be determined for different contents on a same bit in the first recoding information respectively. It should be noted that in such embodiments, for the same content at different positions in the first recoding information, it will be represented using different molecular modules, to include the position information in the molecular module, thereby distinguishing the same content at different positions.

For example, in a specific example, when the obtained initial information is "10011000", it may be represented in a form shown in Table 9 below in the manner described above:

TABLE 9

| First content code | 1 | 0 | 0 | 1 | 1 | 0 | 0 | 0 |
|---|---|---|---|---|---|---|---|---|
| First address code | 0 | 1 | 2 | 3 | 4 | 5 | 6 | 7 |

Furthermore, each first address code therein may be recoded into the 3-bit binary first recoded information, as shown in Table 10 below:

TABLE 10

| First content code | 1 | 0 | 0 | 1 | 1 | 0 | 0 | 0 |
|---|---|---|---|---|---|---|---|---|
| First address code | 0 | 1 | 2 | 3 | 4 | 5 | 6 | 7 |
| First recoding information | 000 | 001 | 010 | 011 | 100 | 101 | 110 | 111 |

Accordingly, a molecular module A1 and a molecular module A2 may be used for representing the two different first content codes "0" and "1" respectively, a molecular module B1 and a molecular module B2 may be used for representing "0" and "1" on the first bit in the first recoding information respectively, a molecular modules B3 and a molecular module B4 may be used for representing "0" and "1" on the second bit in the first recoding information respectively, and a molecular module B5 and a molecular module B6 may be used for representing "0" and "1" on the third bit in the first recoding information respectively, wherein the molecular modules A1, A2, B1, B2, B3, B4, B5 and B6 are molecules or molecule fragments, and they are different from each other. As such, a total of 8 different molecular modules are needed to represent the 8-bit binary initial information. As it can be seen, although the molecular modules B1, B3 and B5 all represent "0"s, since they represent "0"s at different positions in the first recoding information, they are different from each other to distinguish the "0"s at different positions. Similarly, the molecular modules B2, B4 and B6 representing "1"s at different positions are also different from each other.

Figure 4:
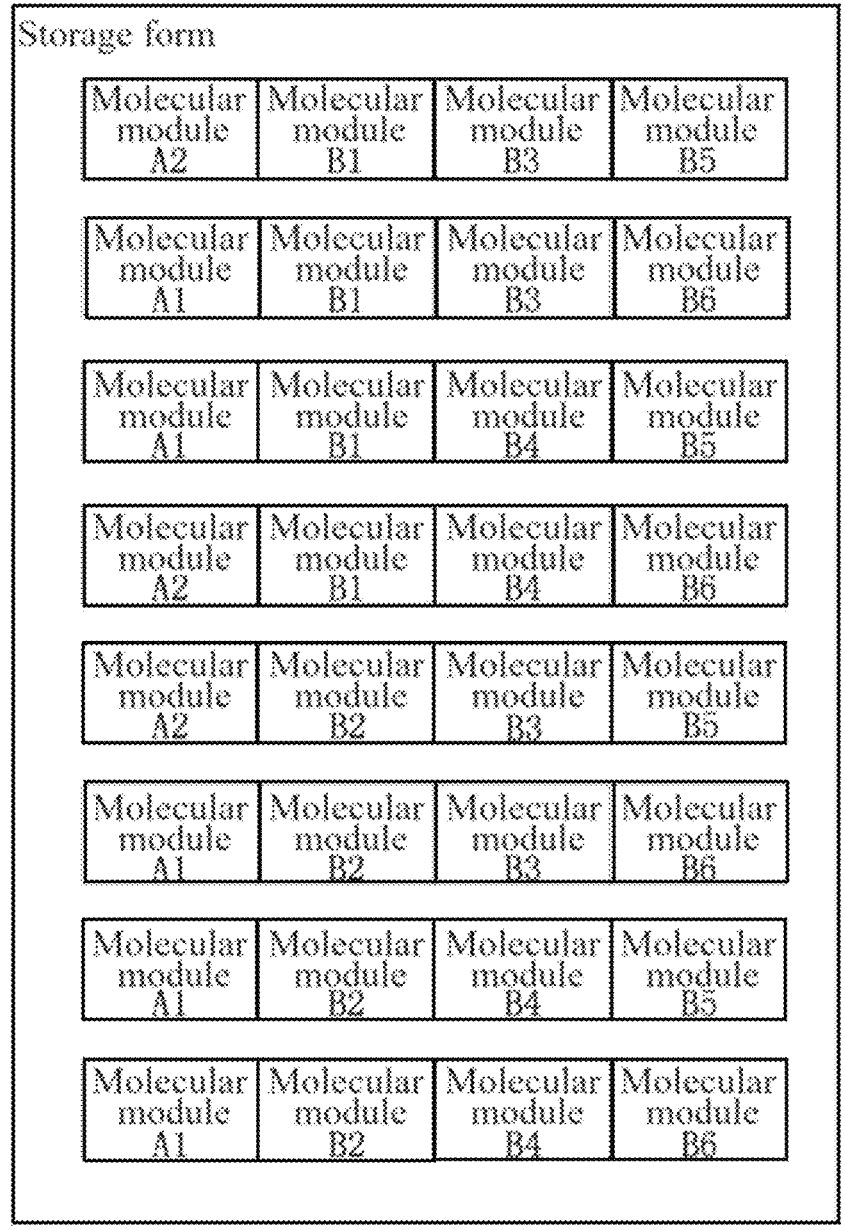
FIG. 4 shows a storage form for storing information in a molecule in a specific example of the present disclosure.

In a specific example, a storage form obtained after combination may be as shown in FIG. 4. Taking the first row as an example, the first to fourth molecular modules from left to right represent, respectively, the first content code on the first bit "1" in the initial information, "0" on the first bit in the first recoding information of the first address code, "0" on the second bit in the first recoding information of the first address code, and "0" on the third bit in the first recoding information of the first address code. By analogy, the first chain in the first row corresponds to "1" on the first bit in the initial information "10011000", the second chain in the second row corresponds to "0" on the second bit in the initial information "10011000", the third chain in the third row corresponds to "0" on the third bit in the initial information "10011000", the fourth chain in the fourth row corresponds to "1" on the fourth bit in the initial information "10011000", the fifth chain in the fifth row corresponds to "1" on the fifth bit in the initial information "10011000", the sixth chain in the sixth row corresponds to "0" on the sixth bit in the initial information "10011000", the seventh chain in the seventh row corresponds to "0" on the seventh bit in the initial information "10011000", and the eighth chain in the eighth row corresponds to "0" on the eighth bit in the initial information "10011000". Each type of molecular chain in each row may be mixed together, or be linked end to end to form a longer molecular chain to represent the initial information.

In some other embodiments, determining the respective molecular modules according to the first content code and the first recoding information may include:

for each first recoding information, representing the first recoding information using a second address code and a second content code, wherein each position in the first recoding information may be represented by a second address code one-to-one corresponding to the position respectively, and a content at each position in the first recoding information may be represented by a respective second content code respectively; and determining respective molecular modules according to the first content code, the second address code and the second content code.

As in the specific example described above, when the obtained initial information is "10011000", each first recoding information may be represented using the second address code and the second content code respectively, as shown in Table 11 below:

TABLE 11

| | First content code | | | | | | | |
|---|---|---|---|---|---|---|---|---|
| | 1 | 0 | 0 | 1 | 1 | 0 | 0 | 0 |
| First address code | 0 | 1 | 2 | 3 | 4 | 5 | 6 | 7 |
| First recoding information | 000 | 001 | 010 | 011 | 100 | 101 | 110 | 111 |

| | Second content code | | | | | | | | | | | | | | | | | | | | | | | |
|---|---|---|---|---|---|---|---|---|---|---|---|---|---|---|---|---|---|---|---|---|---|---|---|---|
| | 0 | 0 | 0 | 0 | 0 | 1 | 0 | 1 | 0 | 0 | 1 | 1 | 1 | 0 | 0 | 1 | 0 | 1 | 1 | 1 | 0 | 1 | 1 | 1 |
| Second address code | 0 | 1 | 2 | 0 | 1 | 2 | 0 | 1 | 2 | 0 | 1 | 2 | 0 | 1 | 2 | 0 | 1 | 2 | 0 | 1 | 2 | 0 | 1 | 2 |

The first content code has two different values of "0" and "1", the second address code has three different values of "0", "1" and "2", and the second content code has two different values of "0" and "1".

Furthermore, in some embodiments, different molecular modules may be determined for the first content code, the second address code, and the second content code respectively to distinguish these three types of codes.

For example, determining the respective molecular modules according to the first content code, the second address code and the second content code may include:

determining different molecular modules for the first content codes with different values respectively; or
determining different molecular modules for the second address codes with different values respectively; or
determining different molecular modules for the second content codes with different values respectively.

For example, in the specific example shown in Table 11 above, two different first content codes "0" and "1" may be represented using the molecular module A1 and the molecular module A2 respectively, two different second content codes "0" and "1" may be represented using a molecular module A3 and a molecular module A4 respectively, and three different second address codes "0", "1" and "2" may be represented using a molecular module A5, a molecular module A6 and a molecular module A7 respectively, wherein the molecular modules A1, A2, A3, A4, A5, A6 and A7 are molecules or molecular fragments, and they are different from each other. As such, a total of 7 different molecular modules are needed to represent the 8-bit binary initial information.

In another specific example of the present disclosure, a storage form obtained after combination may be as shown in FIG. 5. Taking the first row as an example, the first to seventh molecular modules from left to right represent, respectively, the first content code of "1" on the first bit of the initial information, the first bit "0" of the second content code and the corresponding first bit "0" of the second address code of the "1" on the first bit, the second bit "0" of the second content code and the corresponding second bit "1" of the second address code of the first bit, the third bit "0" of the second content code and the corresponding third bit "2" of the second address code of the first bit By analogy, the first chain in the first row corresponds to "1" on the first bit in the initial information "10011000", the second chain in the second row corresponds to "0" on the second bit in the initial information "10011000", the third chain in the third row corresponds to "0" on the third bit in the initial information "10011000", the fourth chain in the fourth row corresponds to "1" on the fourth bit in the initial information "10011000", the fifth chain in the fifth row corresponds to "1" on the fifth bit in the initial information "10011000", the sixth chain in the sixth row corresponds to "0" on the sixth bit in the initial information "10011000", the seventh chain in the seventh row corresponds to "0" on the seventh bit in the initial information "10011000", and the eighth chain in the eighth row corresponds to "0" on the eighth bit in the initial information "10011000". Each type of molecular chain in each row may be mixed together, or be linked end to end to form a longer molecular chain to represent the initial information.

Alternatively, determining the respective molecular modules according to the first content code, the second address code and the second content code may include:
  when the first content code has Nc1 different values, determining different molecular modules for the first content codes with (Nc1−1) different values respectively, and making the first content code with the remaining one value not correspond to any molecular module; or
  when the second address code has Na2 different values, determining different molecular modules for the second address codes with (Na2−1) different values respectively, and making the second address code with the remaining one value not correspond to any molecular module; or
  when the second content code has Nc2 different values, determining different molecular modules for the second content codes with (Nc2−1) different values respectively, and making the second content code with the remaining one value not correspond to any molecular module.

In other words, one code with a certain value may not correspond to any molecular module, but is represented using a default state, which can reduce the number of different types of molecular modules required.

For example, in the specific example shown in Table 11 above, the molecular module A1 may be used for representing the first content code "0", and the default state may be used for representing the first content code "1", that is, there is not any molecular module to represent the first content code "1". In addition, the molecular module A3 and the molecular module A4 may be similarly used for representing the second content codes with two different values "0" and "1", and the molecular module A5, the molecular module A6 and the molecular module A7 may be used for representing the second address codes with three different values "0", "1" and "2", wherein the molecular modules A1, A3, A4, A5, A6 and A7 are molecules or molecule fragments, and they are different from each other. As such, a total of 6 different molecular modules are needed to represent the 8-bit binary initial information.

In some embodiments, different molecular modules may be determined for different value combinations of two of the first content code, the second address code and the second content code.

In a specific example, determining the respective molecular modules according to the first content code, the second address code, and the second content code may include:
  determining different molecular modules for different value combinations of the second address code and the second content code respectively.

For example, in the specific example shown in Table 11 above, a molecular module A8 may be used for representing a combination in which the second content code is "0" and the second address code is "0", a molecular module A9 may be used for representing a combination in which the second content code is "0" and the second address code is "1", a molecular module A10 may be used for representing a combination in which the second content code is "0" and the second address code is "2", a molecular module A11 may be used for representing a combination in which the second content code is "1" and the second address code is "0", a molecular module A12 may be used for representing a combination in which the second content code is "1" and the second address code is "1", and a molecular module A13 may be used for representing a combination in which the second content code is "1" and the second address code is "2". By combining the molecular modules A1 and A2 that represent the first content codes, the initial information in Table 11 may be completely represented. As such, a total of 8 different molecular modules are needed to represent the 8-bit binary initial information.

It can be understood that different molecular modules may also be determined for different value combinations of the first address codes and the second address codes, and the initial information is represented in combination with the molecular module representing the second content code; or different molecular modules may be determined for different value combinations of the first address codes and the second content codes, and the initial information is represented in combination with the molecular module representing the second address code.

Similarly, a default state may be used for representing a value of a combination of two of the first content code, the second address code, and the second content code. For example, determining the respective molecular modules according to the first content code, the second address code and the second content code may include:
  when combination of the second address code and the second content code has Nac2 different values, determining different molecular modules for (Nac2−1) different value combinations of the second address codes and the second content codes respectively, and making the combination of the second address code and the second content code with the remaining one value not correspond to any molecular module.

For example, in the specific example shown in Table 11 above, a default state may be used for representing the combination in which the second content code is "0" and the second address code is "0", the molecular module A9 may be used for representing the combination in which the second content code is "0" and the second address code is "1", the molecular module A10 may be used for representing the combination in which the second content code is "0" and the second address code is "2", the molecular module A11 may be used for representing the combination in which the second content code is "1" and the second address code is "0", the molecular module A12 may be used for representing the combination in which the second content code is "1" and the second address code is "1", and the molecular module A13 may be used for representing the combination in which the second content code is "1" and the second address code is "2". By combining the molecular modules A1 and A2 that represent the first content codes, the initial information in Table 11 may be completely represented. As such, a total of 7 different molecular modules are needed to represent the 8-bit binary initial information.

As shown in FIG. 6, in another exemplary embodiment of the present disclosure, the first content code may be recoded. In particular, the method for storing the information in the molecule may include:

step S220, recoding each first content code respectively, to represent one respective first content code using second recoding information with a second preset bit number and a second preset base; and step S320, determining respective molecular modules according to the first address code and the second recoding information.

In some embodiments, a sum (B2+S2) of the second preset bit number B2 and the second preset base S2 may be less than a maximum possible species number of different values of the first content code, so as to effectively reduce the total number of molecular modules required to characterize the first content codes. Moreover, the second preset base to a power of the second preset bit number ($S2^{B2}$) may be greater than the maximum possible species number of different values of the first content code, so that the second recoding information is able to represent all the first content codes that may appear, to ensure the reliability of coding. For example, in a case that the unit bit number of the initial information fragment is large, if all first content codes with different values are traversed directly to select the respective molecular modules, the number of the molecular modules required to represent the first content codes would be large, thus the first content code may be recoded to obtain the second recoding information to reduce the number required to represent the first content codes.

For example, using the 3-bit binary second recoding information, 5 (i.e., 3+2) different molecular modules may be used for representing a total of 8 (i.e., $2^3$) different first content codes; using the 4-bit binary second recoding information, 6 (i.e., 4+2) different molecular modules may be used for representing a total of 16 (i.e., $2^4$) different first content codes; using the 5-bit binary second recoding information, 7 (i.e., 5+2) different molecular modules may be used for representing a total of 32 (i.e., $2^5$) different first content codes; using the 5-bit ternary second recoding information, 8 (i.e., 5+3) different molecular modules may be used for representing a total of 243 (i.e., $3^5$) different first content codes; using the 10-bit decimal second recoding information, 20 (i.e., 10+10) different molecular modules may be used for representing a total of $10^{10}$ different first content codes. As it can be seen, through recoding, when the number of first content codes that need to be represented increases exponentially, it is only necessary to linearly increase the number of molecular modules, thus greatly reducing the types of molecular modules required.

Furthermore, the respective molecular modules may be determined based on the first address code and the second recoding information. In particular, different molecular modules may be determined for the first address code and the second recoding information respectively.

In some embodiments, when determining the respective molecular modules for the second recoding information, different molecular modules may be determined for contents on different bits in the second recoding information respectively, and different molecular modules may be determined for different contents on a same bit in the second recoding information respectively. It should be noted that in such embodiments, for a same content at different positions in the second recoding information, it will be represented using different molecular modules, to include the position information in the molecular modules, thereby distinguishing the same content at different positions.

In some other embodiments, determining the respective molecular modules according to the first address code and the second recoding information may include:

for each second recoding information, representing the second recoding information using a third address code and a third content code, wherein each position in the second recoding information may be represented by a third address code one-to-one corresponding to the position respectively, and a content at each position in the second recoding information may be represented by a respective third content code respectively; and determining the respective molecular modules according to the first address code, the third address code and the third content code.

For example, when the obtained initial information is "10011000", it may be represented as a form shown in Table 12 below in the manner described above:

TABLE 12

| First content code | 10 | 01 | 10 | 00 |
|---|---|---|---|---|
| First address code | 0 | 1 | 2 | 3 |

Furthermore, each first content code therein may be recoded and be represented using the third address code and the third content code, as shown in Table 13 below:

TABLE 13

| First content code | 10 | | 01 | | 10 | | 00 | |
|---|---|---|---|---|---|---|---|---|
| Third content code | 1 | 0 | 0 | 1 | 1 | 0 | 0 | 0 |
| Third address code | 0 | 1 | 0 | 1 | 0 | 1 | 0 | 1 |
| First address code | 0 | | 1 | | 2 | | 3 | |

The third address code has two different values of "0" and "1", the third content code has two different values of "0" and "1", and the first address code has four different values of "0", "1", "2" and "3" in total.

Furthermore, in some embodiments, different molecular modules may be determined for the first address code, the third address code, and the third content code respectively to distinguish these three types of codes.

Determining the respective molecular modules according to the first address code, the third address code and the third content code may include:

determining different molecular modules for the first address codes with different values respectively; or determining different molecular modules for the third address codes with different values respectively; or determining different molecular modules for the third content codes with different values respectively.

For example, in the specific example shown in Table 13 above, four different first address codes "0", "1", "2" and "3" may be represented using a molecular module A14, a molecular module A15, a molecular module A16 and a molecular module A17 respectively, two different third content codes "0" and "1" may be represented using a molecular module A18 and a molecular module A19, and two different third address codes "0" and "1" may be represented using a molecular module A20 and a molecular module A21, wherein the molecular modules A14, A15, A16, A17, A18, A19, A20 and A21 are molecules or molecular fragments, and they are different from each other. As such, a total of 8 different molecular modules are needed to represent the 8-bit binary initial information.

Alternatively, determining the respective molecular modules according to the first address code, the third address code and the third content code may include:

when the first address code has Na1 different values, determining different molecular modules for the first address codes with (Na1−1) different values respectively, and making the first address code with the remaining one value not correspond to any molecular module; or when the third address code has Na3 different values, determining different molecular modules for the third address codes with (Na3−1) different values respectively, and making the third address code with the remaining one value not correspond to any molecular module; or when the third content code has Nc3 different values, determining different molecular modules for the third content codes with (Nc3−1) different values respectively, and making the third content code with the remaining one value not correspond to any molecular module.

In other words, one code with a certain value may not correspond to any molecular module, but is represented using a default state, which can reduce the number of different types of the molecular modules required.

For example, in the specific example shown in Table 13 above, a default state may be used for representing the first address code "0", that is, there is not any molecular module corresponding to the first address code "0", and the molecular modules A15, A16 and A17 may be used for representing other three different first address codes "1", "2" and "3" respectively. In addition, the molecular modules A18 and A19 may be similarly used for representing two different third content codes "0" and "1", and the molecular modules A20 and A21 are used for representing two different third address codes "0" and "1", wherein the molecular modules A15, A16, A17, A18, A19, A20 and A21 are molecules or molecular fragments, and they are different from each other. As such, a total of 7 different molecular modules are needed to represent the 8-bit binary initial information.

In some embodiments, different molecular modules may be determined for different value combinations of two of the first address code, the third address code and the third content code.

In a specific example, determining the respective molecular modules according to the first address code, the third address code and the third content code may include:

determining different molecular modules for different value combinations of the third address code and the third content code respectively.

For example, in the specific example shown in Table 13 above, a molecular module A22 may be used for representing a combination in which the third content code is "0" and the third address code is "0", a molecular module A23 may be used for representing a combination in which the third content code is "0" and the third address code is "1", a molecular module A24 may be used for representing a combination in which the third content code is "1" and the third address code is "0", and a molecular module A25 may be used for representing a combination in which the third content code is "1" and the third address code is "1". By combining the molecular modules A14, A15, A16 and A17 that represent the first address codes, the initial information in Table 13 may be completely represented. As such, a total of 8 different molecular modules are needed to represent the 8-bit binary initial information.

It can be understood that different molecular modules may be determined for different value combinations of the first address codes and the third address codes, and the initial information is represented in combination with the molecular module representing the third content code; or different molecular modules may be determined for different value combinations of the first address codes and the third content codes, and the initial information is represented in combination with the molecular module representing the third address code.

Similarly, a default state may be used for representing a value of a combination of two of the first address code, the third address code, and the third content code. For example, determining the respective molecular modules according to the first address code, the third address code and the third content code may include:

when combination of the third address code and the third content code has Nac3 different values, determining different molecular modules for (Nac3−1) different value combinations of the third address codes and the third content codes respectively, and making the combination of the third address code and the third content code with the remaining one value not correspond to any molecular module.

For example, in the specific example shown in Table 13 above, a default state may be used for representing the combination in which the third content code is "0" and the third address code is "0", the molecular module A23 may be used for representing the combination in which the third content code is "0" and the third address code is "1", the molecular module A24 may be used for representing the combination in which the third content code is "1" and the third address code is "0", and the molecular module A25 may be used for representing the combination in which the third content code is "1" and the third address code is "1". By combining the molecular modules A14, A15, A16 and A17 that represent the first address codes, the initial information in Table 13 may be completely represented. As such, a total of 7 different molecular modules are needed to represent the 8-bit binary initial information.

In yet another exemplary embodiment of the present disclosure, both the first address code and the first content code may be recoded. In particular, as shown in FIG. 7, the method for storing the information in the molecule may include:

step S230, recoding each first address code and each first content code respectively, to represent one respective first address code using the first recoding information with the first preset bit number and the first preset base, and to represent one respective first content code using the second recoding information with the second preset bit number and the second preset base;

step S330, determining respective molecular modules according to the first recoding information and the second recoding information.

As described above, in some embodiments, the sum (B1+S1) of the first preset bit number and the first preset base may be less than the maximum possible species number of different values of the first address codes, and the sum (B2+S2) of the second preset bit number and the second preset base may be less than the maximum possible species number of different values of the first content codes, so as to effectively reduce the total number of molecular modules required to characterize the first address codes and the first content codes. In addition, the first preset base to the power of the first preset bit number ($S1^{B1}$) may be greater than the maximum possible number of different values of the first address codes, and the second preset base to the power of the second preset bit number ($S2^{B2}$) may be greater than the maximum possible number of different values of the first content codes, so that the first recoding information and the second recoding information may represent all possible first address codes and first content codes that may appear respectively, to ensure the reliability of coding.

In some embodiments, determining the respective molecular modules according to the first recoding information and the second recoding information may include:

determining different molecular modules for the first recoding information and the second recoding information respectively.

As mentioned above, in some embodiments, different molecular modules may be determined for the contents on different bits in the first recoding information respectively, and different molecular modules may be determined for the different contents on the same bit in the first recoding information respectively.

Similarly, in some embodiments, different molecular modules may be determined for the contents on different bits in the second recoding information respectively, and different molecular modules may be determined for the different contents on the same bit in the second recoding information respectively, as described above.

In some embodiments, the first recoding information may further be represented using the second address code and the second content code, wherein each position in the first recoding information may be represented by the second address code one-to-one corresponding to the position respectively, and the content at each position in the first recoding information may be represented by the respective second content code respectively, as described above.

Similarly, in some embodiments, the second recoding information may further be represented using the third address code and the third content code, wherein each position in the second recoding information may be represented by the third address code one-to-one corresponding to the position respectively, and the content at each position in the second recoding information may be represented by the respective third content code respectively, as described above.

It can be understood that, in a specific example, different molecular modules may be determined for the contents on different bits in the first recoding information respectively, different molecular modules may be determined for different contents on the same bit in the first recoding information respectively, different molecular modules may be determined for the contents on different bits in the second recoding information respectively, and different molecular modules may be determined for different contents on the same bit in the second recoding information respectively. In addition, the molecular modules corresponding to the first recoding information and the second recoding information respectively may be different molecules or molecular fragments.

In another specific example, different molecular modules may be determined for the contents on different bits in the first recoding information respectively, and different molecular modules may be determined for different contents on the same bit in the first recoding information respectively, and for each second recoding information, the second recoding information may be represented using the third address code and the third content code, and respective molecular modules may be determined according to the third address code and the third content code. In addition, the molecular modules corresponding to the first recoding information, the third address code and the third content code respectively may be different molecules or molecular fragments.

In yet another specific example, for each first recoding information, the first recoding information may be represented using the second address code and the second content code, and respective molecular modules may be determined according to the second address code and the second content code, and different molecular modules may be determined for the contents on different bits in the second recoding information respectively, and different molecular modules may be determined for different contents on the same bit in the second recoding information respectively. In addition, the molecular modules respectively corresponding to the second address code, the second content code and the second recoding information may be different molecules or molecular fragments.

In still yet another specific example, for each first recoding information, the first recoding information may be represented using the second address code and the second content code, and respective molecular module may be determined according to the second address code and the second content code, and for each second recoding information, the second recoding information may be represented using the third address code and the third content code, and respective molecular module may be determined according to the third address code and the third content code.

For example, when the obtained initial information is "10011000", it may be represented in the form shown in Table 12 in the manner described above. Furthermore, each first address code and each first content code therein may be recoded, and the second address code and the second content code may be used for representing the first recoded information, and the third address code and the third content code may be used for representing the second recoding information, as shown in Table 14 below:

TABLE 14

| First content code | 10 | | 01 | | 10 | | 00 | |
|---|---|---|---|---|---|---|---|---|
| Third content code | 1 | 0 | 0 | 1 | 1 | 0 | 0 | 0 |
| Third address code | 0 | 1 | 0 | 1 | 0 | 1 | 0 | 1 |
| First address code | 0 | | 1 | | 2 | | 3 | |
| Second content code | 0 | 0 | 0 | 1 | 1 | 0 | 1 | 1 |
| Second address code | 0 | 1 | 0 | 1 | 0 | 1 | 0 | 1 |

The second content code, the second address code, the third content code and the third address code each has two different values of "0" and "1".

Furthermore, different molecular modules may be determined for the second address code, the second content code, the third address code and the third content code respectively to distinguish these codes.

In some embodiments, determining the respective molecular modules according to the first recoding information and the second recoding information may include:

determining different molecular modules for the second address codes with different values respectively; or determining different molecular modules for the second content codes with different values respectively; or determining different molecular modules for the third address codes with different values respectively; or determining different molecular modules for the third content codes with different values respectively.

For example, in the specific example shown in Table 14 above, two different second address codes "0" and "1" may be represented using the molecular module A5 and the molecular module A6 respectively, two different second content codes "0" and "1" may be represented using the molecular module A3 and the molecular module A4 respectively, two different third address codes "0" and "1" may be represented using the molecular module A20 and the molecular module A21 respectively, and two different third content codes "0" and "1" may be represented using the molecular module A18 and the molecular module A19 respectively, wherein the molecular modules A5, A6, A3, A4, A20, A21, A18 and A19 are molecules or molecule fragments, and they are different from each other. As such, a total of 8 different molecular modules are needed to represent the 8-bit binary initial information.

Alternatively, determining the respective molecular modules according to the first recoding information and the second recoding information may include:

when the second address code has Na2 different values, determining different molecular modules for the second address codes with (Na2−1) different values respectively, and making the second address code with the remaining one value not correspond to any molecular module; or when the second content code has Nc2 different values, determining different molecular modules for the second content codes with (Nc2−1) different values respectively, and making the second content code with the remaining one value not correspond to any molecular module; or when the third address code has Na3 different values, determining different molecular modules for the third address codes with (Na3−1) different values respectively, and making the third address code with the remaining one value not correspond to any molecular module; or when the third content code has Nc3 different values, determining different molecular modules for the third content codes with (Nc3−1) different values respectively, and making the third content code with the remaining one value not correspond to any molecular module.

In other words, one value of one code may not correspond to any molecular module, but is represented using a default state, which can reduce the number of types of molecular modules required.

For example, in the specific example shown in Table 14 above, a default state may be used for representing the second address code "0", that is, there is not any molecular module corresponding to the second address code "0", and the molecular module A6 may be used for representing the second address code "1", the molecular modules A3 and A4 may be used for representing two different second content codes "0" and "1", the molecular modules A20 and A21 may be used for representing two different third address codes "0" and "1", the molecular modules A18 and A19 may be used for representing two different third content codes "0" and "1", wherein the molecular modules A6, A3, A4, A20, A21, A18 and A19 are molecules or molecule fragments, and they are different from each other. As such, a total of 7 different molecular modules are needed to represent the 8-bit binary initial information.

In some embodiments, different molecular modules may be determined for different value combinations of two or three of the second address code, the second content code, the third address code and the third content code.

In a specific example, determining the respective molecular modules according to the first recoding information and the second recoding information may include:

determining different molecular modules for different value combinations of the second address code and the second content code respectively; or determining different molecular modules for different value combinations of the third address code and the third content code respectively.

For example, in the specific example shown in Table 14 above, the molecular module A8 may be used for representing the combination in which the second content code is "0" and the second address code is "0", the molecular module A9 may be used for representing the combination in which the second content code is "0" and the second address code is "1", the molecular module A11 may be used for representing the combination in which the second content code is "1" and the second address code is "0", and the molecular module A12 may be used for representing the combination in which the second content coded is "1" and the second address coded is "1". In addition, the molecular module A22 may be used for representing the combination in which the third content code is "0" and the third address code is "0", the molecular module A23 may be used for representing the combination in which the third content code is "0" and the third address code is "1", the molecular module A24 may be used for representing the combination in which the third content code is "1" and the third address code is "0", and the molecular module A25 may be used for representing the combination in which the third content code is "1" and the third address code is "1".

In some embodiments, the molecular modules A8, A9, A10, A11, A22, A23, A24 and A25 may be used for representing the 8-bit binary initial information. Alternatively, the molecular modules A8, A9, A10, A11, A20, A21, A18 and A19 may be used for representing the 8-bit binary initial information. Alternatively, the molecular modules A3, A4, A5, A6, A22, A23, A24 and A25 may be used for representing the 8-bit binary initial information.

It can be understood that respective molecular modules may alternatively be determined based on the combinations of other two or three of the second address code, the second content code, the third address code and the third content code, which will not be repeated here again.

Similarly, a default state may be used for representing one value of a combination of the second address code, the second content code, the third address code and the third content code. In a specific example, determining the respective molecular modules according to the first recoding information and the second recoding information may include:

when the combination of the second address code and the second content code has Nac2 different values, determining different molecular modules for the combinations of the second address codes and the second content codes with (Nac2−1) different values, and making the combination of the second address code and the second content code with the remaining one value not correspond to any molecular module; or when the combination of the third address code and the third content code has Nac3 different values, determining different molecular modules for the combinations of the third address codes and the third content codes with (Nac3−1) different values, and making the combination of the third address code and the third content code with the remaining one value not correspond to any molecular module.

For example, in the specific example shown in Table 14 above, a default state may be used for representing the combination in which the third content code is "0" and the third address code is "0", the molecular module A23 may be used for representing the combination in which the third content code is "0" and the third address code is "1", the molecular module A24 may be used for representing the combination in which the third content code is "1" and the third address code is "0", and the molecular module A25 may be used for representing the combination in which the third content code is "1" and the third address code is "1". By combining the molecular modules A10, A11, A12 and A13 that represent different value combinations of the second content codes and the second address codes, the initial information in Table 14 may be completely represented. As such, a total of 7 different molecular modules are needed to represent the 8-bit binary initial information.

Furthermore, as shown in FIGS. 2, 6 and 7, the method for storing the information in the molecule may further include:
step S400, combining the determined molecular modules in order, such that a composition corresponds to the initial information.

In exemplary embodiments of the present disclosure, the molecular module may include a deoxyribonucleic acid (DNA), a ribonucleic acid (RNA), a peptide, an organic polymer, an organic small molecule, a carbon nanomaterial, an inorganic substance, and the like. In addition, the molecular module may further include an unnatural nucleotide, a modified nucleotide, an artificially synthetic nucleotide, and the like. When storing the information, it involves a combination of different molecular modules that represent the content code and the address code. These molecular modules may be combined together through the action mode such as a covalent bond, an ionic bond, a hydrogen bond, an intermolecular force, a hydrophobic force, a complementary base pairing, and the like.

Different molecular modules representing different values of the same type of content code or address code may be the same type of molecular modules, e.g., all are DNAs. Alternatively, different molecular modules representing different values of the same type of content code or address code may be different types of molecular modules, e.g., two different values of a type of content code are represented using a DNA and a RNA respectively. In addition, molecular modules representing different types of content code or address code may be the same type of molecular modules, e.g., all the content code and address code are represented using different RNAs. Alternatively, different types of content code and address code may be represented using different types of molecular modules respectively, e.g., the content code is represented using a RNA, and the address code is represented using a DNA, and the like.

In addition, different molecular modules may be distinguished by using at least one of their sequence distributions, sequence lengths, or secondary structures. For example, different values of different codes may be represented using different sequences, different lengths, or different secondary structures of DNAs, RNAs, peptides, and organic polymers. In addition, different values of different codes may be represented using different chemical forms, physical properties, crystalline or amorphous properties and morphological forms of DNAs, RNAs, peptides, organic polymers, organic small molecules, non-natural nucleotides, modified nucleotides, artificially synthetic nucleotides, carbon nanomaterials and inorganic substances.

Furthermore, the composition obtained by combining the molecular modules may be a mixture or a compound. For example, the composition may include a plurality of different DNA chains, which may represent one or more initial information fragments in the initial information respectively, and the DNA chains may be mixed together to represent the complete initial information. Alternatively, DNA chains representing various initial information fragments may be further synthesized into the longer DNA chain to represent the complete initial information in the form of compound.

When combining the molecular modules representing various codes sequentially, the molecular module representing the address code may be combined in front of, behind, or inserted in the middle of the molecular module representing the respective content code, which is not limited herein. In addition, the molecular module representing a certain address code or content code may include multiple molecular fragments, and these molecular fragments may be deployed at intervals. For example, the molecular module representing the second address code may be combined in front of, behind, or inserted in the middle of the molecular module representing the respective second content code.

In addition, in order to enable different molecular modules to be connected to each other sequentially, in some embodiments, when selecting a molecular module, the molecular module with a respective terminal portion may be selected, that is, the molecular fragment as the terminal portion is a part of the respective molecular module to achieve the sequential connection of the different molecular modules.

Alternatively, in some other embodiments, combining the determined molecular modules in order, such that the composition corresponds to the initial information may include: forming the terminal portions corresponding to a preset order at the connection ends of the determined molecular modules; and mixing the molecular modules formed with the respective terminal portions to produce the composition corresponding to the initial information. That is, the molecular fragment serving as the terminal portion is added to the respective molecular module after the molecular module is determined.

For example, in the specific example shown in FIG. 5, during the combination process, different terminal portions may be added to the tails of the molecular modules A3 so that they can be connected to the molecular modules A5, A6 and A7 respectively, to form the correct molecular chain.

In a specific example, DNAs may be used as the molecular modules. DNA is composed of bases, deoxyribose and phosphate, wherein the bases include four types in total: adenine (A), guanine (G), thymine (T) and cytosine (C). In a DNA molecular structure, two polydeoxynucleotide chains are coiled around a common central axis to form a double helix structure. The deoxyribose-phosphate chain is on the outside of the helix structure, with the bases facing inward. The two polydeoxynucleotide chains complement each other reversely and connected through base pairing formed by hydrogen bonds between the bases, forming a fairly stable combination. Accordingly, the terminal portions of the DNA molecular modules may include sticky ends.

Figure 8:
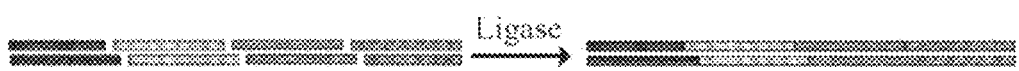
FIG. 8 shows a schematic diagram of combined molecular modules according to a first specific example of the present disclosure.

When assembling the DNAs representing different codes, as shown in FIG. 8, a ligase may be used for sequentially combining the determined multiple DNA chains corresponding to the respective address code and content code.

Figure 9:
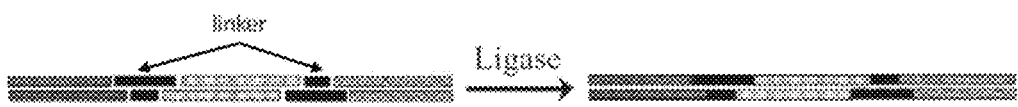
FIG. 9 shows a schematic diagram of combined molecular modules according to a second specific example of the present disclosure.

Alternatively, as shown in FIG. 9, a linker provided at the end of the DNA chain may be used for sequentially combining the determined multiple DNA chains under the action of a ligase.

Figure 10:
FIG. 10 shows a schematic diagram of combined molecular modules according to a third specific example of the present disclosure.
Figure 11:
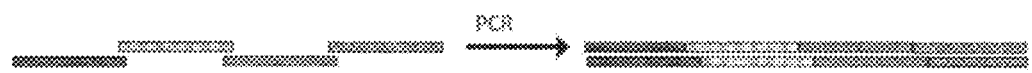
FIG. 11 shows a schematic diagram of combined molecular modules according to a fourth specific example of the present disclosure.

Alternatively, as shown in FIGS. 10 and 11, a polymerase chain reaction (PCR) may be used for sequentially combining the determined DNAs. In the PCR method shown in FIG. 10, the determined multiple DNA chains are used as templates, and the DNA chains containing respective sequences at the connecting ends of two segments of DNA chains to be connected are amplified. In the PCR method shown in FIG. 11, the DNA chains to be connected may be amplified directly.

In another specific example, RNAs may be used as the molecular modules. RNA is composed of phosphate, ribose and bases. The bases of RNAs mainly include four types: A (adenine), G (guanine), C (cytosine), and U (uracil). Accordingly, a terminal portion of an RNA molecular module may include corresponding functional groups.

Figure 12:
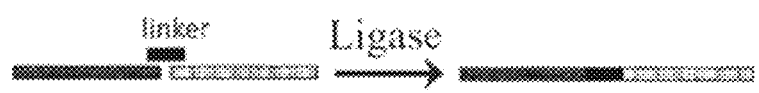
FIG. 12 shows a schematic diagram of combined molecular modules according to a fifth specific example of the present disclosure.

As shown in FIG. 12, a linker sequence provided at the end of the RNA chain and a linker sequence of the DNA may be used for sequentially combining the determined multiple RNA chains under the action of a ligase.

In yet another specific example, peptides may be used as the molecular modules. An amino group of one amino acid can condense with a carboxyl group of another amino acid to form a peptide, and the resulting amide group is referred to a peptide bond in protein chemistry. Molecules of amino acids are the smallest and those of proteins are the largest. Two or more amino acids are dehydrated and condensed to form several peptide bonds to form one peptide chain. Multiple peptide chains undergo multi-level folding to form one protein molecule. Proteins are sometimes referred to as "polypeptides". Accordingly, terminal portions of a peptide molecular module may include corresponding functional groups.

Figure 13:
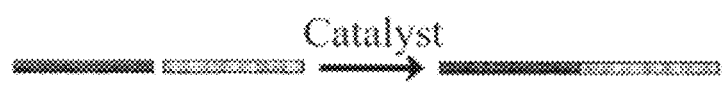
FIG. 13 shows a schematic diagram of combined molecular modules according to a sixth specific example of the present disclosure.

As shown in FIG. 13, the determined peptides can be connected under the action of a catalyst to represent at least part of the initial information.

Figure 14:
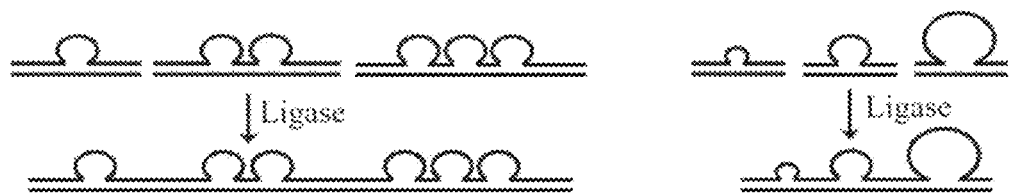
FIG. 14 shows a schematic diagram of combined molecular modules according to a seventh specific example of the present disclosure.

In addition, as described above, different secondary structures of molecular modules may be used for representing different values of different codes. As shown in two specific examples in FIG. 14, molecular modules with different secondary structures may be connected together under the action of a ligase.

In addition, in order to facilitate reading the stored information and avoid interference in reading information caused by individual errors in the combination of molecular modules, an editing distance between different molecular modules may be greater than or equal to a preset distance threshold. The editing distance is the number of operation steps required to convert one molecular module to another molecular module. For example, when a molecular module is a DNA chain including 10 bases, the editing distance between the molecular modules "ATCGTAGCCA" and "TTCGTAGCCA" is 1, and the editing distance between the molecular modules "ATCGTAGCCA" and "TAGCATCGGT" is 10. In order to facilitate reading, when designing the molecular modules, only multiple molecular modules whose editing distance between two of them is greater than or equal to the preset distance threshold may be selected. As such, during the process of reading information, even if there are errors in individual bases or other fragments in the molecular module, as long as it can be determined that the editing distance is less than the preset distance threshold, the read molecular module can still correspond to a specific code, thereby improving the fault tolerance of molecular storage.

In the method for storing the information in the molecule of the present disclosure, the information is stored according to the content-address pair, and the information storage is achieved by recoding the address and/or the content of the information and repeatedly using the molecular modules in a prefabricated molecular module library for a large-scale parallel assembly. Compared with storing the information by the way of growing nucleotides one by one to synthesize the DNA, the number of types of molecular modules required is greatly reduced, and parallel assembly greatly improves the efficiency of combination, thereby reducing the storage difficulties and improving the storage efficiency.

Figure 15:
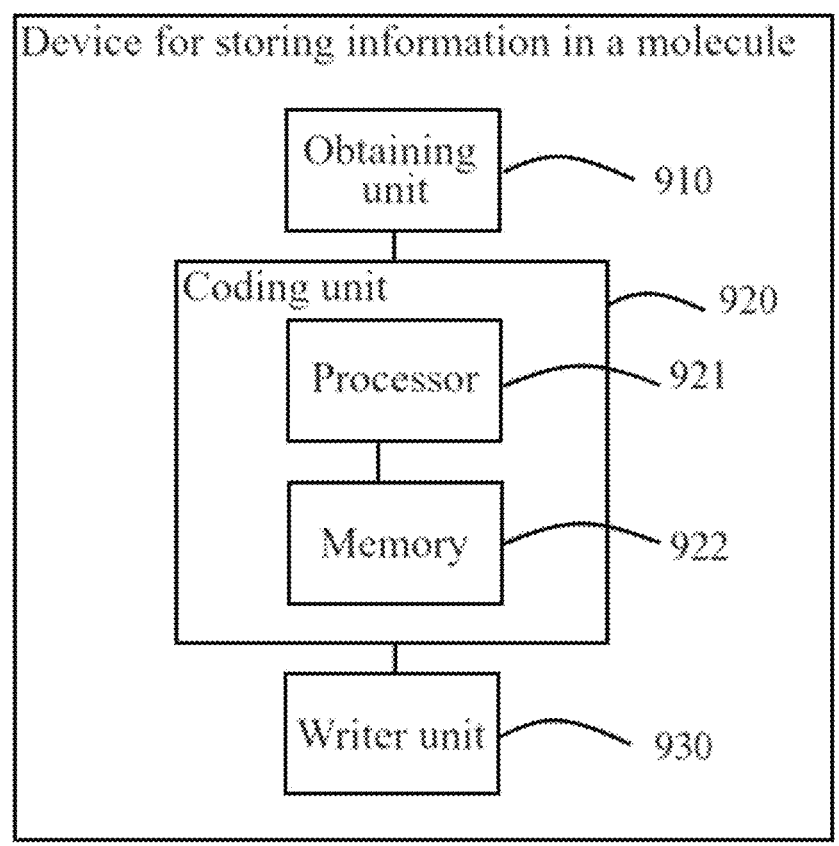
FIG. 15 shows a block diagram of a device for storing information in a molecule according to an exemplary embodiment of the present disclosure.

In addition, the present disclosure further proposes a device for storing information in a molecule. As shown in FIG. 15, the device may include an obtaining unit 910 and a coding unit 920.

The obtaining unit 910 may be configured to obtain initial information to be stored.

The coding unit 920 may be configured to represent the initial information using a first address code and a first content code, wherein each position in the initial information is represented by a first address code one-to-one corresponding to the position respectively, and a content at each position of the initial information is represented by a respective first content code respectively.

In an exemplary embodiment, the coding unit 920 may be further configured to recode each first address code respectively to represent one respective first address code using first recoding information with a first preset bit number and a first preset base; and to determine respective molecular modules according to the first content code and the first recoding information.

In another exemplary embodiment, the coding unit 920 may be further configured to recode each first content code respectively to represent one respective first content code using second recoding information with a second preset bit number and a second preset base; and to determine respective molecular modules according to the first address code and the second recoding information.

In yet another exemplary embodiment, the coding unit 920 may be further configured to recode each first address code and each first content code respectively, to represent one respective first address code using first recoding information with a first preset bit number and a first preset base, and to represent one respective first content code using second recoding information with a second preset bit number and a second preset base; and to determine respective molecular modules according to the first recoding information and the second recoding information.

In some embodiments, the coding unit 920 may include a processor 921 and a memory 922. The memory 922 has instructions stored thereon, which, when executed by the processor 921, implement the coding steps as described above.

The processor 921 can perform various actions and processes according to the instructions stored in the memory 922. In particular, the processor 921 may be an integrated circuit chip with signal processing capabilities. The above processor may be a general-purpose processor, a digital signal processor (DSP), an application-specific integrated circuit (ASIC), a field programmable gate array (FPGA) or other programmable logic device, a discrete gate or a transistor logic device, or a discrete hardware component. Various methods, steps, and logical block diagrams disclosed in the embodiments of the present disclosure may be implemented or executed. The general-purpose processor can be a microprocessor or the processor can be any conventional processor, etc., and can be an X86 architecture or an ARM architecture, etc.

The memory 922 stores executable instructions, which, when executed by the processor 921, implement the coding methods as described above. The memory 922 may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which acts as an external cache. By way of illustration, but not limitation, many forms of RAM are available, such as a Static Random Access Memory (SRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Synchronous Linked Dynamic Random Access Memory (SLDRAM) and a Direct Memory Bus Random Access Memory (DR RAM). It should be noted that the memories for the methods described herein are intended to include, but not limited to, these and any other suitable types of memory.

In addition, the device may further include a writer unit 930, which may be configured to combine the determined molecular modules in order, such that a composition corresponds to the initial information.

It should be noted that the flowcharts and block diagrams in the drawings illustrate possible implemented architectures, functions and operations of systems, methods and computer program products according to various embodiments of the present disclosure. In this regard, each block in the flowcharts or block diagrams may represent a module, a program segment, or a portion of code that contains one or more executable instructions for implementing the specified logic functions. It should also be noted that, in some alternative implementations, functions labeled in the blocks may also occur in a sequence different from that labeled in the drawings. For example, two blocks shown one after another may actually execute substantially in parallel, or they may sometimes execute in reverse order, depending on the functionality involved. It will also be noted that each block of the block diagrams and/or flowcharts, and combinations of blocks in the block diagrams and/or flowcharts, can be implemented by special purpose hardware-based systems that perform the specified functions or operations, or can be implemented using a combination of specialized hardware and computer instructions.

Generally speaking, the various example embodiments of the present disclosure may be implemented in hardware or special purpose circuits, software, firmware, logic, or any combination thereof. Some aspects may be implemented in hardware, while other aspects may be implemented in firmware or software that may be executed by a controller, microprocessor, or other computing device. While aspects of embodiments of the present disclosure are illustrated or described as block diagrams, flowcharts, or using some other graphical representations, it will be understood that the blocks, apparatus, systems, techniques, or methods described herein may be, by way of non-limiting examples, implemented in hardware, software, firmware, special purpose circuit or logic, general purpose hardware or controllers, or other computing devices, or some combination thereof.

In the description and claims, the words "front", "back", "top", "bottom", "above", "below", etc., if present, are used for descriptive purposes and are not necessarily used for describing a constant relative position. It should be understood that the words so used are interchangeable under appropriate circumstances such that the embodiments of the disclosure described herein, for example, can be operated in other orientations than those illustrated or otherwise described herein.

As used herein, the word "exemplary" means "serving as an example, instance, or illustration" rather than as a "model" that will be reproduced precisely. Any implementation exemplarily described herein is not necessarily to be construed as preferred or advantageous over other implementations. Furthermore, the disclosure is not constrained by any expressed or implied theory presented in the above technical field, background, summary or detailed description.

As used herein, the word "substantially" is meant to include any minor variations resulting from design or manufacturing defects, device or element tolerances, environmental effects, and/or other factors. The word "substantially" also allows for differences from perfect or ideal conditions due to parasitic effects, noise, and other practical considerations that may be present in actual implementations.

Additionally, the foregoing description may refer to elements or nodes or features being "connected" or "coupled" together. As used herein, unless expressly stated otherwise, "connected" means that one element/node/feature is electrically, mechanically, logically, or otherwise directly connected to another element/node/feature (or direct communication). Similarly, unless expressly stated otherwise, "coupled" means that one element/node/feature can be directly or indirectly connected mechanically, electrically, logically, or otherwise to another element/node/feature to allow interactions even though these two features may not be connected directly. That is, "coupled" is intended to encompass both direct connections and indirect connections of elements or other features, including connections utilizing one or more intervening elements.

In addition, "first", "second" and similar terms may also be used herein for reference purposes only and are therefore not intended to be limiting. For example, the words "first", "second", and other such numerical words involving structures or elements do not imply a sequence or order unless expressly stated in the context.

It should also be understood that the words "comprising/including" when used herein illustrate the presence of the indicated features, integers, steps, operations, units and/or components, but does not exclude the presence or addition of one or more other features, integers, steps, operations, units and/or components and/or combinations thereof.

In this disclosure, the term "providing" is used in a broad sense to cover all ways of obtaining an object, so "providing an object" includes but is not limited to "purchasing", "preparing/manufacturing", "arranging/setting", "installing/assembly", and/or "order" the object, and the like.

Although some specific embodiments of the present disclosure have been described in detail by way of examples, those skilled in the art will understand that the above examples are for illustration only and are not intended to limit the scope of the disclosure. The various embodiments disclosed herein may be combined in any manner without departing from the spirit and scope of the disclosure. Those skilled in the art will further understand that various modifications may be made to the embodiments without departing from the scope and spirit of the disclosure. The scope of the disclosure is defined by the appended claims.

What is claimed is:

1. A method for storing information in a molecule, comprising:

obtaining initial information to be stored, and representing the initial information using a first address code and a first content code, wherein each position in the initial information is represented by a first address code one-to-one corresponding to the position respectively, and a content at each position of the initial information is represented by a respective first content code respectively;

recoding each first address code respectively, to represent one respective first address code using first recoding information with a first preset bit number and a first preset base;

determining respective molecular modules according to the first content code and the first recoding information; and combining the determined molecular modules in order, such that a composition corresponds to the initial information.

2. The method according to claim 1, wherein obtaining the initial information to be stored, and representing the initial information using the first address code and the first content code comprises:

obtaining the initial information;

determining a unit bit number of a content at one position in the initial information corresponding to one first address code, wherein the unit bit number of the content at each position in the initial information is equal to each other;

when a total bit number of the initial information is an integer multiple of the unit bit number, dividing the initial information into one or more initial information fragments; and when the total bit number of the initial information is not an integer multiple of the unit bit number, padding the initial information so that the total bit number of the resulting padded initial information is an integer multiple of the unit bit number, and dividing the padded initial information into one or more initial information fragments;

wherein a bit number of each initial information fragment is the unit bit number.

3. The method according to claim 2, wherein padding the initial information comprises:

supplementing a placeholder content in the initial information, wherein the placeholder content and a non-placeholder content in the initial information correspond to different molecular modules respectively.

4. The method according to claim 1, wherein the initial information further comprises an error correction content.

5. The method according to claim 1, wherein a sum of the first preset bit number and the first preset base is less than a maximum possible species number of different values of the first address code; and the first preset base to a power of the first preset bit number is greater than the maximum possible species number of different values of the first address code.

6. The method according to claim 1, wherein determining the respective molecular modules according to the first content code and the first recoding information comprises:

determining different molecular modules for the first content code and the first recoding information respectively.

7. The method according to claim 6, wherein determining the respective molecular modules according to the first content code and the first recoding information comprises:

determining different molecular modules for contents on different bits in the first recoding information respectively; and determining different molecular modules for different contents on a same bit in the first recoding information respectively.

8. The method according to claim 1, wherein determining the respective molecular modules according to the first content code and the first recoding information comprises:

for each first recoding information, representing the first recoding information using a second address code and a second content code, wherein each position in the first recoding information is represented by a second address code one-to-one corresponding to the position respectively, and a content at each position in the first recoding information is represented by a respective second content code respectively; and determining the respective molecular modules according to the first content code, the second address code and the second content code.

9. The method according to claim 8, wherein determining the respective molecular modules according to the first content code, the second address code and the second content code comprises:

determining different molecular modules for the first content code, the second address code and the second content code respectively.

10. The method according to claim 9, wherein determining the respective molecular modules according to the first content code, the second address code and the second content code comprises: determining different molecular modules for the first content codes with different values respectively, or determining different molecular modules for the second address codes with different values respectively, or determining different molecular modules for the second content codes with different values respectively; or determining the respective molecular modules according to the first content code, the second address code and the second content code comprises: when the first content code has Nc1 different values, determining different molecular modules for the first content codes with (Nc1−1) different values respectively, and making the first content code with one remaining value not correspond to any molecular module, or when the second address code has Na2 different values, determining different molecular modules for the second address codes with (Na2−1) different values respectively, and making the second address code with one remaining value not correspond to any molecular module, or when the second content code has Nc2 different values, determining different molecular modules for the second content codes with (Nc2−1) different values respectively, and making the second content code with one remaining value not correspond to any molecular module.

11. The method according to claim 8, wherein determining the respective molecular modules according to the first content code, the second address code and the second content code comprises:

determining different molecular modules for different value combinations of two of the first content code, the second address code and the second content code respectively.

12. The method according to claim 11, wherein determining the respective molecular modules according to the first content code, the second address code and the second content code comprises: determining different molecular modules for different value combinations of the second address code and the second content code respectively; or determining the respective molecular modules according to the first content code, the second address code and the second content code comprises: when the combination of the second address code and the second content code has Nac2 different values, determining different molecular modules for the combinations of the second address codes and the second content codes with (Nac2−1) different values respectively, and making the combination of the second address code and the second content code with one remaining value not correspond to any molecular module.

13. The method according to claim 1, wherein combining the determined molecular modules in order, such that the composition corresponds to the initial information comprises:

forming terminal portions corresponding to a preset order at connection ends of the determined molecular modules; and mixing the molecular modules formed with the respective terminal portions to produce the composition corresponding to the initial information.

14. The method according to claim 13, wherein a molecular fragment serving as a terminal portion is a part of the respective molecular module; or the molecular fragment serving as a terminal portion is added to the respective molecular module after the molecular module is determined.

15. The method according to claim 13, wherein mixing the molecular modules formed with the respective terminal portions to produce the composition corresponding to the initial information comprises at least one of:

combining the determined molecular modules in order using a ligase;

combining the determined molecular modules in order using a linker disposed at the end of each molecular module; or combining the determined molecular modules in order using a polymerase chain reaction.

16. The method according to claim 1, wherein each molecular module comprises at least one of a deoxyribonucleic acid, a ribonucleic acid, a peptide, an organic polymer, an organic small molecule, a non-natural nucleotide, a modified nucleotide, an artificially synthetic nucleotide, a carbon nanomaterial, an inorganic substance, or spaced molecular fragments.

17. The method according to claim 1, wherein various molecular modules are distinguished using at least one of their sequence distributions, sequence lengths, secondary structures, crystalline or amorphous natures, or morphologies.

18. The method according to claim 1, wherein an editing distance between different molecular modules is greater than or equal to a preset distance threshold.

19. A device for storing information in a molecule, comprising:

an obtaining unit configured to obtain initial information to be stored;

a coding unit configured to perform operations comprising:

representing the initial information using a first address code and a first content code, wherein each position in the initial information is represented by a first address code one-to-one corresponding to the position respectively, and a content at each position of the initial information is represented by a respective first content code respectively;

recoding each first address code respectively, to represent one respective first address code using first recoding information with a first preset bit number and a first preset base; and determining respective molecular modules according to the first content code and the first recoding information.

20. The device according to claim 19, further comprising:

a writer unit configured to combine the determined molecular modules in order, such that a composition corresponds to the initial information.

* * * * *